(12) United States Patent
Hisatomi et al.

(10) Patent No.: US 6,661,933 B1
(45) Date of Patent: Dec. 9, 2003

(54) APPARATUS AND METHOD FOR IMAGE DATA PROCESSING

(75) Inventors: Kenji Hisatomi, Osaka-fu (JP); Kazuyuki Murata, Kyoto-fu (JP); Takehito Yamaguchi, Osaka-fu (JP); Hideyuki Kuwano, Osaka-fu (JP); Yuji Okada, Hyogo-ken (JP); Naoki Takahashi, Osaka-fu (JP); Joji Tanaka, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/225,540

(22) Filed: Jan. 5, 1999

(30) Foreign Application Priority Data

Jan. 13, 1998 (JP) .......................... 10-004453
Jun. 4, 1998 (JP) .......................... 10-156007
Jun. 18, 1998 (JP) .......................... 10-171146
Jun. 22, 1998 (JP) .......................... 10-174868

(51) Int. Cl.[7] .................. G06K 9/46; G06K 9/62; H04N 1/387; H04N 1/40
(52) U.S. Cl. ............... 382/306; 382/248; 382/239; 382/236; 382/209; 358/453; 358/449; 358/403
(58) Field of Search ............... 382/305, 306, 382/307, 282, 302, 217, 303, 218, 209, 295, 219, 294, 229, 291, 236, 286, 239, 284, 245, 248, 249, 278; 358/403, 405, 444, 445, 449, 450, 452, 453

(56) References Cited

U.S. PATENT DOCUMENTS 4,739,377 A * 4/1988 Allen .......................... 355/133
5,185,821 A * 2/1993 Yoda .......................... 382/306
5,339,412 A * 8/1994 Fueki .......................... 395/600
5,444,779 A * 8/1995 Daniele .......................... 380/3
5,548,666 A * 8/1996 Yoneda et al. .......................... 382/276
5,583,941 A * 12/1996 Yoshida et al. .......................... 380/51
5,625,770 A * 4/1997 Nomura .......................... 395/761
5,752,152 A * 5/1998 Gasper et al. .......................... 399/366
5,754,308 A * 5/1998 Lopresti et al. .......................... 358/403
5,765,176 A * 6/1998 Bloomberg .......................... 707/514
5,822,083 A * 10/1998 Ito et al. .......................... 358/403
5,873,077 A * 2/1999 Kanoh et al. .......................... 707/3
6,002,491 A * 12/1999 Li et al. .......................... 358/436

FOREIGN PATENT DOCUMENTS

JP 62-219769 9/1987
JP 07-143272 6/1995
JP 10-134071 5/1998

* cited by examiner

Primary Examiner—Bhavesh M. Mehta
Assistant Examiner—Yosef Kassa
(74) Attorney, Agent, or Firm—McDermott, Will & Emery

(57) ABSTRACT

When an image is to be filed in the storage means 105, an original copy size detection means 102b identifies the type (size and lay) of the original copy. A first positioning means 11a puts up a plurality of possible places on the printing paper to write the ID mark in, the plurality of possible places given a priority number. A space checking means 6 checks the possible space which comes up for checking according to priority numerical order and notifies the first positioning means 11a of the results. A pattern synthesizing means 108 integrates an ID mark corresponding to the document ID in the space found to be blank by the space checking means 6, generating an image representing the marked sheet.

41 Claims, 37 Drawing Sheets

Fig. 27

SPECIFICATION

[Title of the Invention] Data Recorder

[Claims]

M₁ 0000004
C₁ Document ID :0000001
ID mark code: 0000004
Encoded number
Scrambled
document ID:0000004

[CLAIM]

[Claim 1] A data recorder equipped with storing unit composed of host adaptor connected to host bus and storing medium connected to said host adaptor, comprising a group of storing units composed of a plural number of sets of said storing unit, an input proportioning means for splitting the data to be stored into prescribed size units and assigning said split data to a plural number of storing media so that the respective storing media may become a single logical M₂ 0000007
C₂ Document ID :0000002
ID mark code: 0000007
Encoded number
Scrambled
document ID:0000007

Fig 10 is a conceptual drawing showing an example of construction of a conventional data recorder in computer. A host adaptor 2 is connected to the host bus 1 of the computer 8. The host adaptor 2 developed in recent years is adapted to bus master DMA transfer capable of transfer at higher speed and in case of occurrence of any command for recording and readout to the hard disc 4 a controller 6 inside the host adaptor 2 obtains the monopoly right of the host bus1, and the controller 6 transfers any desired data from the memory 5 to a buffer memory 7 incorporated in the host adaptor 2 through the host bus 1. In this way, the data written in the buffer memory 7 is recorded in the hard disc 4 through the transfer bus 3. Next, when reading out the data the controller 6 transfers the data in the hard disc 4 to the buffer memory 7 through the M₃ 0000006
C₃ Document ID :0000003
ID mark code: 0000006
Encoded number
Scrambled
document ID:0000006

Fig. 28
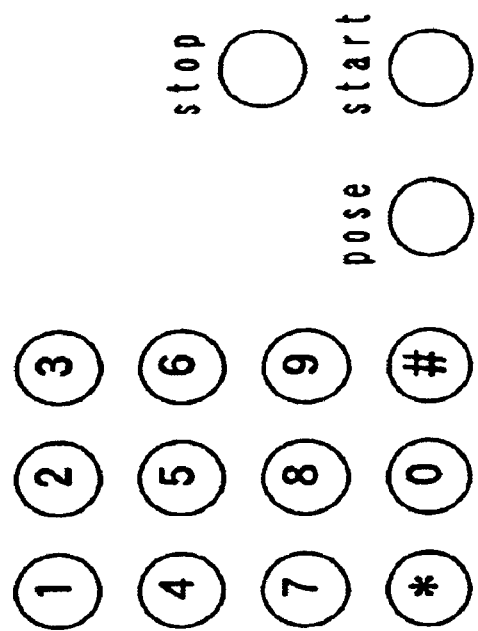
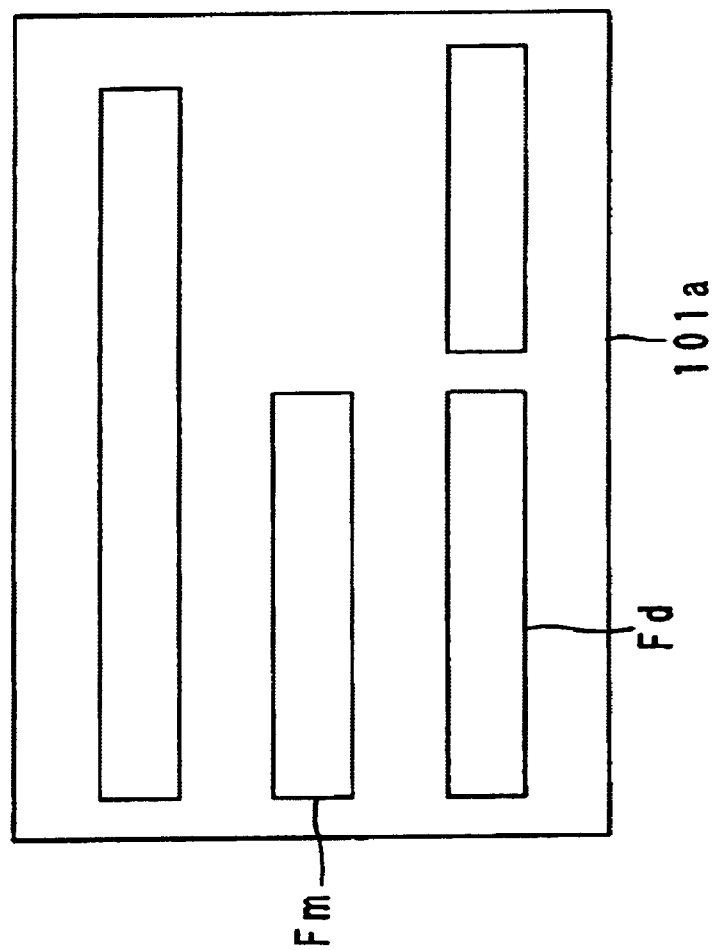

Fig. 34(a)  Scrambled

SPECIFICATION

[Title of the Invention] Data Recorder

[Claims]

M21 / C21  Document ID :0000001
ID mark code: 1-0000004
Encoded number
Scrambled
document ID:0000004

Not Scrambled → Fig. 34(b)

[CLAIM]

[Claim 1]   A data recorder equipped with storing unit composed of host adaptor connected to host bus and storing medium connected to said host adaptor, comprising a group of storing units composed of a plural number of sets of said storing unit, an input proportioning means for splitting the data to be stored into prescribed size units and assigning said split data to a plural number of storing media so that the respective storing media may become a single logical

M22 / C22  Document ID :0000002
ID mark code: 0-0000002
Encoded number

Fig. 34(c)

Fig 10 is a conceptual drawing showing an example of construction of a conventional data recorder in computer. A host adaptor 2 is connected to the host bus 1 of the computer 8. The host adaptor 2 developed in recent years is adapted to bus master DMA transfer capable of transfer at higher speed and in case of occurrence of any command for recording and readout to the hard disc 4 a controller 6 inside the host adaptor 2 obtains the monopoly right of the host bus 1, and the controller 6 transfers any desired data from the memory 5 to a buffer memory 7 incorporated in the host adaptor 2 through the host bus 1. In this way, the data written in the buffer memory 7 is recorded in the hard disc 4 through the transfer bus 3. Next, when reading out the data the controller 6 transfers the data in the hard disc 4 to the buffer memory 7 through the

M23 / C23  Document ID :0000003
ID mark code: 0-0000003
Encoded number

Fig. 36(c)

Fig 10 is a conceptual drawing showing an example of construction of a conventional data recorder in computer. A host adaptor 2 is connected to the host bus 1 of the computer 8. The host adaptor 2 developed in recent years is adapted to bus master DMA transfer capable of transfer at higher speed and in case of occurrence of any command for recording and readout to the hard disc 4 a controller 6 inside the host adaptor 2 obtains the monopoly right of the host bus 1, and the controller 6 transfers any desired data from the memory 5 to a buffer memory 7 incorporated in the host adaptor 2 through the host bus 1. In this way, the data written in the buffer memory 7 is recorded in the hard disc 4 through the transfer bus 3. Next, when reading out the data the controller 6 transfers the data in the hard disc 4 to the buffer memory 7 through the

M33 0-0000003
C33  Document ID : 0000003
     ID mark code: 0000003
     Encoded number

Fig. 36(b)  Not Scrambled ↑

[CLAIM]
 [Claim 1]    A data recorder equipped with storing unit composed of host adaptor connected to host bus1 and storing medium connected to said host adaptor, comprising a group of storing units composed of a plural number of sets of said storing unit, an input proportioning means for splitting the data to be stored into prescribed size units and assigning said split data to a plural number of storing media so that the respective storing media may become a single logical

M32 0-0000002
C32  Document ID : 0000002
     ID mark code: 0000002
     Encoded number

Fig. 36(a)  Scrambled ↓

SPECIFICATION

[Title of the Invention] Data Recorder

[Claims]

M31 1-0000004
C31  Document ID : 0000001
     ID mark code: 0000001
     Encoded number
     Scrambled
     document ID:0000004

Fig. 37

[NAME OF DOCUMENT]   Specification
[TITLE OF INVENTION]   Data Recorder
[CLAIMS]
  [Claim 1]   A data recorder equipped with storing unit composed of host adaptor connected to host bus and storing medium connected to said host adaptor, comprising
  a group of storing units composed of a plural number of sets of said storing unit,
  an input proportioning means for splitting the data to be stored into prescribed size units and assigning said split data to a plural number of storing media so that the respective storing media may become a single logical storing space, and
  a storing means for issuing commands to the respective host adaptors at a time to transfer said assigned data in prescribed size to the respective storing media
  [Claim 2]   A data recorder as defined in Claim 1, wherein said input proportioning means is further provided with a function of receiving input data
  [Claim 3]   A data recorder as defined in Claim 1, wherein said input proportioning means temporarily holds said split data on the memory in correspondence to the respective storing units, and then said storing means issues data transfer commands to said respective storing media based on the state of saving in said memory.

$S_m$

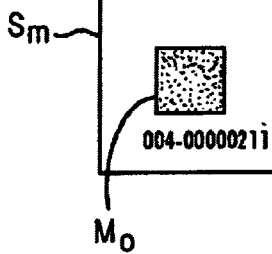

004-00000211

$M_o$

APPARATUS AND METHOD FOR IMAGE DATA PROCESSING

FIELD OF THE INVENTION

The present invention relates to an apparatus for image data processing, more particularly to an apparatus for image data processing which permits the filing and fetching of document images

BACKGROUND OF THE INVENTION

An example of the prior art to which the present invention relates is an electronic filing system which, as has been proposed, involves inputting image data by image data inputting means such as a scanner, filing those image data on storage means such as magnetic disks, optical disks and photo-electromagnetic disks and fetching out the filed image data for printing as necessary.

In an image data processing apparatus described in the Japanese patent laid-open publication No. 62-219769, for example, image data are processed this way: image data inputted by image data inputting means is given an file name based on the document identification (ID) which can identify that image data. The document ID is converted into a bar code at the same time and this bar code is incorporated with the data by placing on the first page of the image data or in a specific space of a page with a particular image when the data is printed out into a marked original copy (which shall be referenced herein as marked sheet). The particular images include the title, user and filing date of the document image, for example.

To fetch out or print out the image data filed in the storage means, the first step is to read the bar code on the marked sheet and convert it into a document ID so that the object image data may be found out.

In addition, a digital multi-functional image data processor has been announced in recent years. This image data processor is a combination of digital imaging equipment such as a facsimile transmitter and printer with a digital copying machine. In this space-saving machine, too, the document ID is utilized in data processing steps such as filing and fetching out image data for printing out, facsimile transmission and transferring to a computer.

To read a bar code, however, the operator had to handle the bar code reader in the image data processor described in the Japanese patent laid-open publication No. 62-219769, and the identification of the image data could fail through faulty handling Furthermore, the position where the bar code was incorporated was fixed in many cases, and it could happen that the bar code was overwritten on the text of an important document, incurring an unintended but serious omission in the contents of the document.

Thus, it is a first object of the present invention to provide an apparatus for image data processing which permits finding out image data without manual control more accurately and speedily.

A second object of the present invention lies in inscribing in a specific place or space of the printing paper a mark for identification of image data such as a bar code in a simple operation if human judgement is to be involved.

In the present invention, too, a bar code on the marked sheet is read by the bar code reader. While no problem arises as long as the bar code is clear enough, the bar code image can wear out and blur as it passes from duplication to duplication until it can no longer be read correctly by the bar code reader.

The applicants of the present invention have also applied patents in other countries for image data processors which involve filing image data in a storage means and "at the same time" outputting an image with an ID mark such as a bar code and a two-dimensional mark representing the document ID (on the first page of the image data or some other page where the title or the like is shown). The foreign patent applications filed are Japanese Patent Application No. H10-007712, U.S. patent application Ser. No. 09/034.999, E.P. Patent Application No. 9830148.9, and Chinese Patent Application No. 98106013.7. It is noted that in the Japanese Patent laid-open publication No. 62-219769, the filing and the outputting are performed not "at the same time." To search for an image data according to those patent applications, the ID mark is read by original copy reading means used for inputting images. That also presents the wearing problem of the ID mark as the mark passes through many duplications.

The aforesaid marked sheet is required when an image data filed in the image data processor is to be fetched out. But no ID mark is needed when only information on the marked sheet should be duplicated without the ID mark or when document filing information needs to be protected against leakage through the ID mark In addition, it is so arranged that the ID mark is made to show in preference to the document image. That is a problem when the original document image is needed and found to be missing in part.

Thus, it is a third object of the present invention to provide an apparatus for image data processing in which there will be no wearing of the ID mark on the mark sheet when the mark comes down through many duplications. It is another object of the present invention to provide an apparatus and method which permits outputting data with the ID mark erased when it is not needed. It is a further object of the present invention to provide an apparatus and method in which the part of the original document image hidden by the ID mark space will not be lost.

The following solution can be thought of to the problem that the ID mark wears out so much that it is impossible to read: A series of digits or letters as a document ID is printed below the ID mark on the marked sheet, and the document ID is inputted directly from the keyboard or the like to search for and fetch out the object image data.

But the problem with such a method involving the displaying of the document ID itself is that the image data can be taken out with the document ID alone without using the marked sheet. Another problem with that method is that it amount to opening to the public the document ID—file management information—as output for printing out. The document ID's are usually given to documents in a logical sequence that makes it easy to build up a document file system. That is, an outside operator, who were interested in wrongfully getting access to a certain image data and in possession of marked sheets for other image data filed before and after the object data, could guess the document ID for the object image data from the document ID's printed on his or her own marked sheets.

Because of that low security feature, that method presented a serious problem in protecting image data against wrong hands.

Thus, it is a fourth object of the present invention to provide an apparatus for image data processing which protects image data against wrongful approach, ensuring the confidentiality thereof.

SUMMARY OF THE INVENTION

First, the present invention is built up on an apparatus for image data processing in which document images inputted by an original copy reading means 102a making up an image data inputting means 102 are filed, with a document ID given to it, in a storage means 105 and managed by a document image managing means 103. This apparatus for image data processing is provided with an image outputting means 109 which outputs the aforesaid filed document with an ID mark inscribed therein—the ID mark corresponding to the document ID and generated by an encoding means 107.

Furthermore, the aforesaid apparatus for image data processing can read that ID mark inscribed on the original copy, that is, a marked sheet, find out the corresponding image data by decoding the ID mark through the decoding means, and fetch out the found image data (for printing out, facsimile transmission etc.).

To Attain the First Object:

Built on that apparatus for image data processing, the present invention adopts the following means (see FIGS. 1 to 4).

To illustrate, when an image is to be filed in the storage means 105, the original copy reading means 102a in the image data inputting means 102 converts an original digitally to generate an image data and at the same time an original copy size detection means 102b identifies the type (size and lay) of the original copy as shown in FIG. 1. A first positioning means 11a refers to a first position information table T1a on the basis of the results of the type identification by the original copy size detection means 102b, and puts up a plurality of possible places on the printing paper to write the ID mark in, the plurality of possible places given a priority number. A space checking means 6 checks the possible space which comes up for checking according to priority numerical order and notifies the first positioning means 11a of the results. A pattern synthesizing means 108 integrates an ID mark corresponding to the document ID in the space found to be blank by the space checking means 6, generating an image representing the marked sheet. The image thus generated is printed out as a marked sheet by an image outputting means 109.

When the image filed by the storage means 105 is to be fetched out, the first positioning means 11a refers to a first position information table T1a on the basis of the type identified by the original copy size detection means 102b, and puts up a plurality of possible places on the printing paper to read out the document ID mark from, the plurality of possible places given a priority number. The original copy reading means 102a reads out those plurality of possible positions in the order of priority numbers. When an ID mark is found, it is digitally converted and inputted in a decoding means 111, which decodes and convert the mark into a document ID. The image data indicated by the document ID is read out from the storage means 105 and printed out by an image outputting means 109. In case the above-mentioned decoding fails, the decoding management means 13 instructs the decoding means 111 to try another decoding method.

Since no manual operation involves in the present invention, an image data can be found out in a more accurate and speedier way. In addition, there is no possibility of an ID mark being over-written on the original image data.

To Attain the Second Object:

The present invention adopts the following means (see FIGS. 5 to 17).

The aforesaid apparatus for image data processing is so configured that a second positioning means 11b decides on a position on the printing paper where an ID mark is to be integrated with the image data. An image pattern synthesizing means 108 then integrates the ID mark with the image data at the position determined by the second positioning means 11b so as to prepare a document image with an ID mark inscribed therein or a marked sheet.

For the second positioning means 11b to be able to decide on a position for integration of the ID mark, there is provided a positioning marking that is, a number of guide frames 32, each for a different paper size, drawn on the original copy plate or the document plate 30 of the original copy reading means 102a, and a simulation mark 4a drawn at the position within each guide frame where the ID mark is to be placed.

This way, the second positioning means 11b can decide on a place to integrate the ID mark in according to the paper size and the position of the simulation mark 4.

An inputting means 101 may be provided with position keys 20a to 20d representing the "lower left", "upper right", "lower right" and "upper left" on the paper respectively so that the position to place the ID mark at may be selected through one of those keys.

If the lay of the original contents, that is, whether the original copy is a portrait image or a landscape image is known, the printing position for the ID mark can be automatically determined. Therefore, it may be so arranged that a contents checking means 72 is provided so that the position to integrate the ID mark at may be determined according to the judgement results of the contents lay checking means 72.

The configuration about the filing of picture element data has been described. In addition, the present invention is applicable to picking out a particular image data out of the image data kept in the storage means 105 by reading an ID mark inscribed on the marked sheet. That is, the second positioning means 11b determines the ID mark position for reading the ID mark.

To detect the paper size, there is provided with an original copy size checking means 102b which finds the length of the sides in the feeding direction of the original placed on the document plate and the length of the sides perpendicular to the feeding direction. Or the operator enters the paper size by key from the input operation means 101.

To Attain the Third Object:

Furthermore, there are provided the following arrangements (see FIGS. 18 to 24).

First, the decoding means 111 decodes an ID mark acquired from the image data inputting means 102. The document image managing means 103 then finds out an image data on the basis of the document ID obtained from the decoding means 111 and at the same time outputs the position data in the document where the ID mark is placed. Then the pattern synthesizing means 108 integrates a specific image at the position of the ID mark on the image data inputted from the image data inputting means 102 and refers it to the outputting means 109. Thereby, a marked sheet is printed with the specific image inscribed at the position of the ID mark.

If an ID mark acquired from the encoding means 107 is to be used as the specific image, it means that the operator is always in possession of a marked sheet with an ID mark newly inscribed therein. That precludes the possibility of errors occurring in fetching out data or the like using that marked sheet.

If the specific image is the part which is clipped out of the original image by a clipping means 120 at the ID mark position of the document image, then the operator will be able to carry a marked sheet with a full text.

In case, furthermore, a mask image outputted by a masking means 121 is to be the specific image, the operator will be able to distribute to others a marked sheet without the document ID shown To Attain the Fourth Object:

The following means are adopted (FIGS. 25 to 36).

In this apparatus for image data processing, an inputted image data is filed in the storage means 105, and the document image managing means 103 generates a document ID representing the image data on a sequential basis and controls the image data according to the document ID. At the same time, the inputted image data is outputted by the image outputting means 109 with the ID mark and/or a display code inscribed therein which are generated on the basis of the document ID to specify the image data. This display code, actually shown on the marked sheet, is made up of a series of digits or letters.

It is also so configured that an ID mark or a display code is outputted to specify a particular image data, which is then outputted through the image outputting means 109.

In the apparatus for image data processing, the document ID generated by the document image managing means 103 is converted into a scrambled document ID which corresponds to the document ID but is not one of logically consecutive numbers. At the same time, a display code and/or a code for ID are outputted according to the scrambled document ID to integrate the image data with an ID mark and/or the display code generated on the basis of the code for ID mark, which is then outputted through the image outputting means 109.

To be concrete, that is effected by providing a scrambling means 106 and a pattern synthesizing means 108. The scrambling means 106 converts the document ID generated by the document image managing means 103 into a scrambled document ID which corresponds to the document ID one-to-one, yet is not one of logically consecutive numbers, and at the same time outputs the display code and/or the code for the ID mark on the basis of the scrambled document ID. The pattern synthesizing means 108 integrates the image data with the ID mark and/or the display code generated according to the code for the ID mark and directs the image outputting means 109 to output the results.

In case the pattern synthesizing means 108 synthesizes the ID mark, an encoding means 107 is additionally provided which encodes the code for the ID mark into an image pattern or the ID mark.

The scrambled document ID can be used in a display code to be outputted, and that makes it impossible to guess the display code for the image data from the display code for another image data and secretly fetch out the image data. The ID mark can also be encoded on the basis of the scrambled document ID. Then the display code for the image data can not be guessed even if the ID mark is decoded, which protects the image data against wrongful access.

It also may be so configured that the apparatus is provided with a code type selection means 113 which enables the operator to choose on which basis to output the display code and/or the code for the ID mark, on the basis of the document ID or the scrambled document ID.

That allows the operator to file image data in four different modes—different in degree of protecting confidentiality.

Also in this apparatus for image data processing, the inputted ID mark is converted into a document ID which corresponds to the scrambled document ID in case the code for the ID mark converted into a value before encoding or the inputted display code is based on a scrambled document ID.

To be concrete, that is effected by provision of a scrambled document ID decoding means 110 which, in case the code for the ID mark converted into a value before encoding or the inputted display code is based on a scrambled document ID, converts the inputted ID mark into a document ID which corresponds to the scrambled document ID.

There is also provided a decoding means which, in case a particular image data is specified by inputting the ID mark, further converts the ID mark into a code for the ID mark before encoding.

Even if, therefore, the code for the ID mark or the display code is based on the scrambled document ID, a particular image data can be specified and outputted through the image outputting means 109.

In still another configuration, an ID checking means 114 is provided which judges which the code for the ID mark belongs to, the document ID or the scrambled document ID.

Even if, therefore, on which the code for the ID mark or the code for display is based, on the document ID or the scrambled document ID, is mixed and different depending on the image data, a particular image data can be specified and outputted through the image outputting means 109.

BRIEF DESCRIPTION OF THE DRAWINGS

FIG. 27 shows examples of three marked sheets with image data filed continuously in Embodiment IV-1.

FIG. 28 is a view of an operation panel on which the way to fetch out image data is selected in Embodiment IV-1.

FIG. 34(a), FIG. 34(b) and FIG. 34(c) show examples of three marked sheets with image data filed continuously in Embodiment IV-2.

FIG. 36(a), FIG. 36(b) and FIG. 36(c) show examples of three marked sheets with image data filed continuously in Embodiment IV-2.

FIG. 37 shows an example of a marked sheet in Embodiment I.

DETAILED DESCRIPTION OF THE INVENTION

To Attain the First Object:

Embodiment I

A first embodiment of the present invention will be described with reference to drawings.

Figure 1:
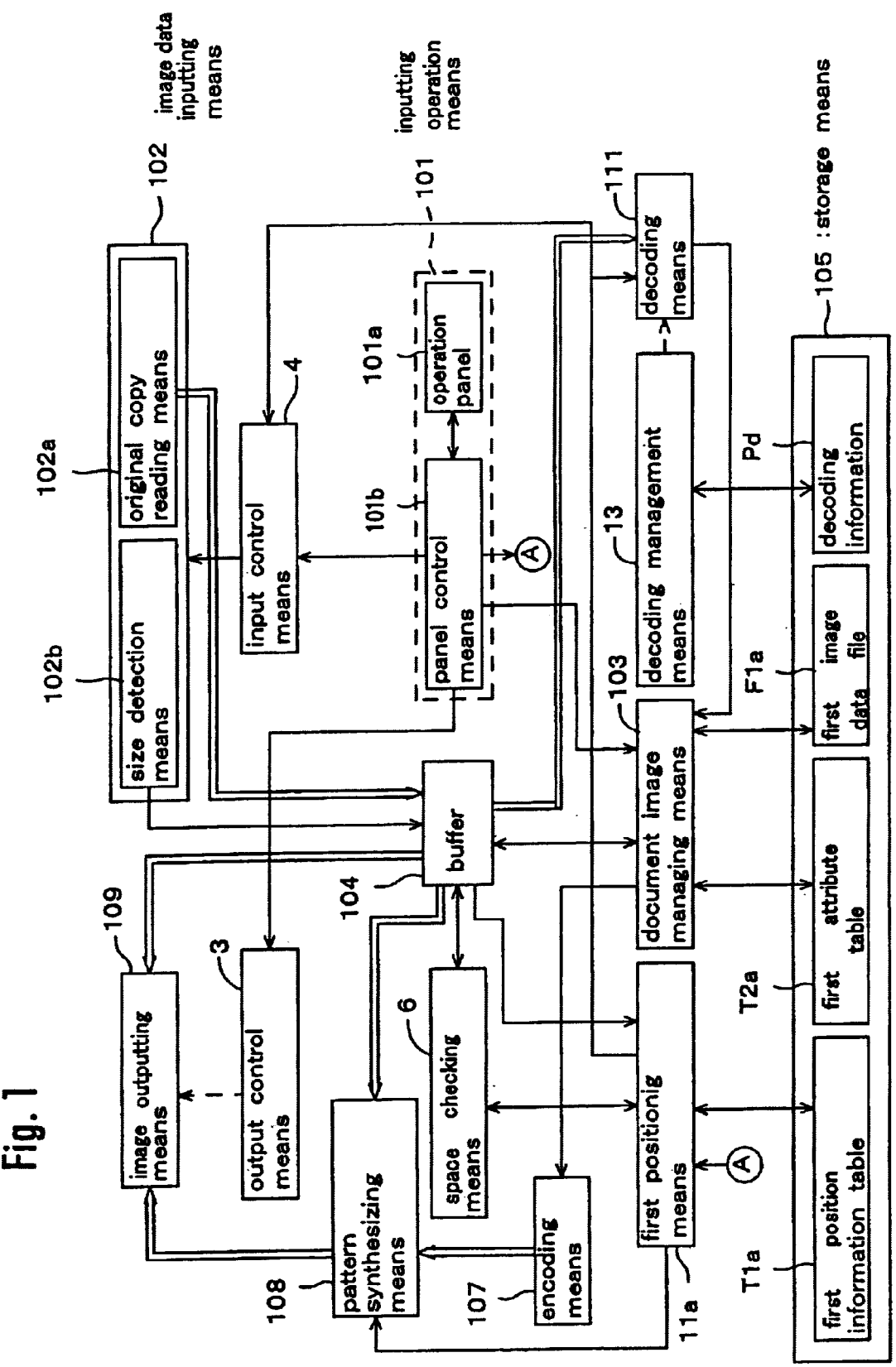
FIG. 1 is a block diagram of an essential part of the apparatus for image data processing in Embodiment I.

FIG. 1 is a block diagram of an essential part of the first embodiment of the present invention. The configuration and operation will be explained. In FIG. 1, the double line indicates the flow of main image data, while the arrow with solid line indicates the flow of other data.

The processes the operator may instruct the apparatus for image data processing of the present invention to perform are "filing an image" and "fetching out an image". Filing an image is the process of filing the original in the storage means 105 of the apparatus for image data processing. Fetching out an image involves fetching out the image filed in the filing process for printing out, facsimile transmission, transferring to a computer or the like. Of the two processes, "filing an image" will now be described hereinafter.

Figure 2:
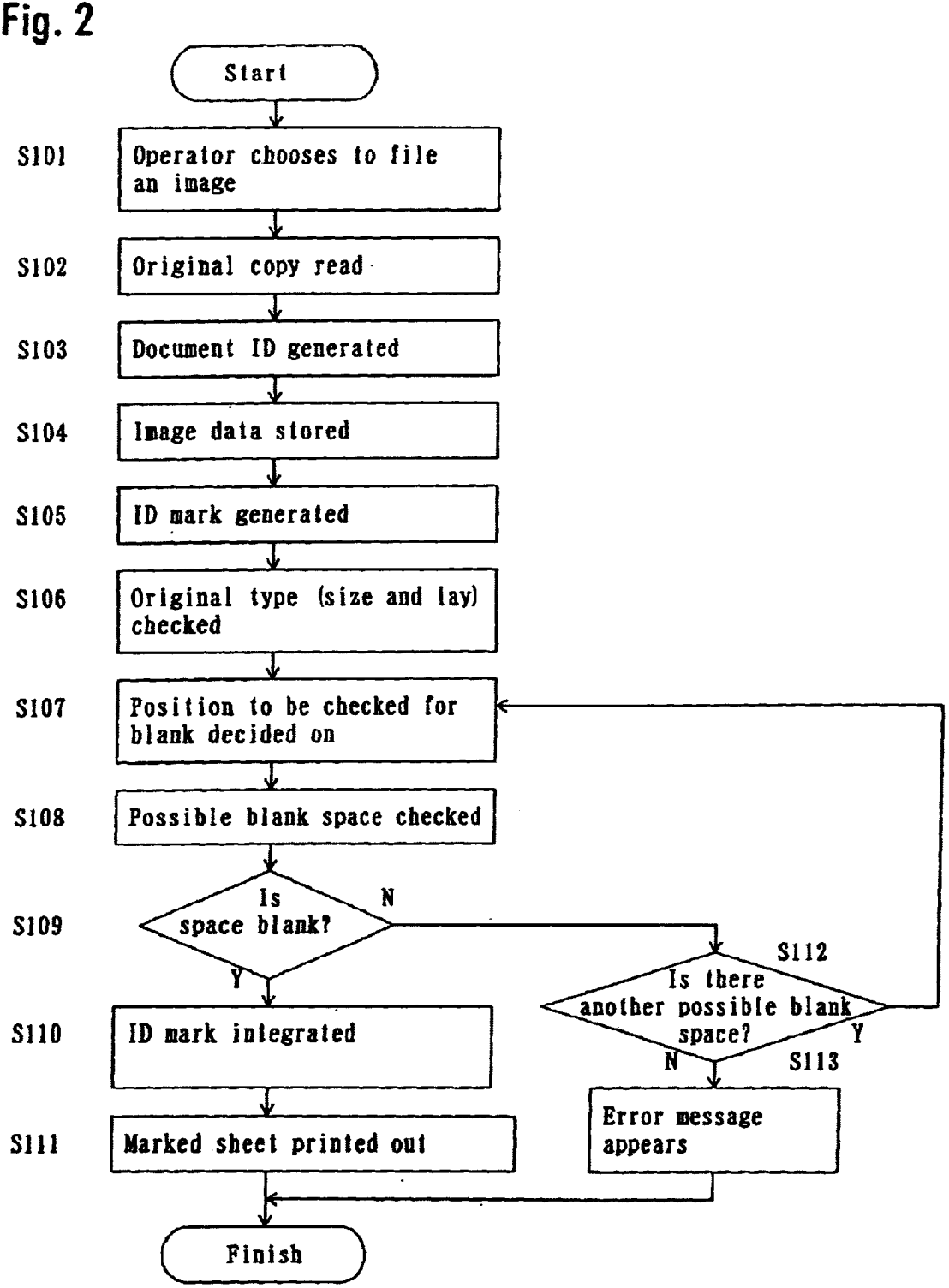
FIG. 2 is a flowchart showing the process of filing an image" in Embodiment I.

First, when the operator chooses the process of filing an image through a liquid crystal display (LCD) panel with a touch panel or an operation panel 101a with a plurality of keys as ten keys, this choice or instruction information is kept in a panel control means 101b. In the next step, the operator presses the start button on the operation panel 101a, and the panel control means 101b orders an input control means 4 to read the original and at the same time directs the document image managing means 103 to file the image data (FIG. 2, Step S 101). The aforesaid input control means 4 controls the drive of an image data inputting means 102 such as, for example, a digital scanner.

Ordered, the input control means 4 directs an original copy reading means 102a provided in the image data inputting means 102 to read the original. The original copy reading means 102a then reads and converts the original digitally and stores it in a buffer 104 as an image data FIG. 2, Step S 102).

Instructed to file the image data, the document image managing means 103 generates a document ID made up of, say, 8 digits for the image data to be filed. Further, the document image managing means 103 gives the image data stored in the buffer 104 a file name to match with the document ID and stores the data stored in the buffer 104 as image data file F1a in a storage means 105 such as hard disk (FIG. 2, Steps S 103 to S 104).

Furthermore, the document image managing means 103 registers on a first attribute table T2a in the storage means 105 the aforesaid document ID and such attribute information on the image data as "filing date", "pointer information (storage address for the image data in the storage means)" and "image size (size of the image data file F1a adapted to the standard paper size)".

The document ID generated by the document image managing means 103 is then encoded by the encoding means 107 into an ID mark such as, for example, an image pattern of a two-dimensional bar code. The encoded ID mark is stored on a bit-map memory in the pattern synthesizing means 108 (FIG. 2, Step S 105).

In parallel with that process, the original size detection means 102b provided in the image data inputting means 102 identifies the type of the original such as the size and lay of the original set on the original copy reading means 102a, and the positioning means 11a is informed of the results (FIG. 2, step S 106). The original size identification is possible to perform in a number of ways including one in which the identification is done with the original placed on the document plate and another in which the length of the sides in the feeding direction and the length of the sides in the direction perpendicular thereto are detected while the original is being fed into the original copy reading means 102a.

The first positioning means 11a refers to the first position information table T1a in the storage means 105 on the basis of the type of the original found by the original copy size detection means 102b. The first position information table T1a contains information indicating a plurality of possible positions for the ID mark to be written in for every type of the original as in Table 1, for example.

To take an example of the case where an original copy in the JIS paper size A4 is placed portrait-wise as seen from the operator's position on the original copy reading means 102a. The original copy size detection mean 102b finds the type of the original to be A4 and placed portrait-wise. The results are notified to the first positioning means 11a. The first positioning means 11a refers to the first position information table T1a, and reserves the possible positions for the writing in of the document ID—lower left position information, upper right position information, lower right position information and upper left position information—in that order. In this regard, the position information is enough if it can specify the position on the original, and is given with a specific position on the original as coordinate origin.

TABLE I

| Original size/lay | 1st proposed space | 2nd proposed space | 3rd proposed space | 4th proposed space |
|---|---|---|---|---|
| A4 portrait | lower left | upper right | lower right | upper left |
| A4 landscape | ... | ... | ... | ... |
| ... | ... | ... | ... | ... |

Then, the first positioning means 11a first directs the space checking means 6 to judge if the first proposed lower left position is a blank space or not (FIG. 2, Step S 107).

It is understood that the blank space is a space where an ID mark can be written without impairing the contents of the original, that is, a position made up of picture elements of a specific type only.

In case the lower left position is made up of picture elements of a specific type only, the space checking means 6 notifies the first positioning means 11a that the lower left position is blank. The first positioning means 11a then chooses the lower left position as space for the document ID and instructs the pattern synthesizing means 108 to write the document ID down in the space. The pattern synthesizing means 108 integrates the ID mark stored in the bit-map memory at the lower left position of the document image kept in the buffer 104 and generates an image data representing a marked sheet. This document image is printed out as a marked sheet Sm with ID mark Mo inscribed thereon as shown in FIG. 37 from the image outputting means 109 at the instruction of the output control means 3 which controls the drive of the image outputting means 109 such as a printer of the electrophotographic type, for example, bringing to an end the image filing process FIG. 2, Steps S 108 to S 111).

If picture elements of a plurality of types are found in the lower left space, the space checking means 6 decides and informs the first positioning means 11a that the lower left position is not blank. The first positioning means 11a then instructs the space checking means 6 to see if the second proposed upper right position is blank or not. In the image data stored in the buffer 104, the space checking means 6 examines the picture elements at the upper right (FIG. 2, Steps S 108–S 109–S 112–S 107–S 108).

These steps are repeated until a blank space is found. In case any of the proposed spaces is not found to be blank, an error message is shown on the operation panel 101a with the process of filing the image coming to a close (FIG. 2, Step S 113).

In case the image data is made up of a plurality of pages, a specific image data such as an image data at the first page, for example, can be an object for integration of the ID mark.

There will next be described "the process of fetching out an image data," the image data specified by the ID mark on the marked sheet from the storage means 105 using the marked sheet generated in the preceding "process of filing the image" and according to the flow chart shown in FIG. 3.

The operator first places the marked sheet on the original copy reading means 102a and chooses the process of fetching out an image data on the operation panel 101a. This choice or instruction is then stored in the panel control means 101b (FIG. 3, Step S 121).

Figure 3:
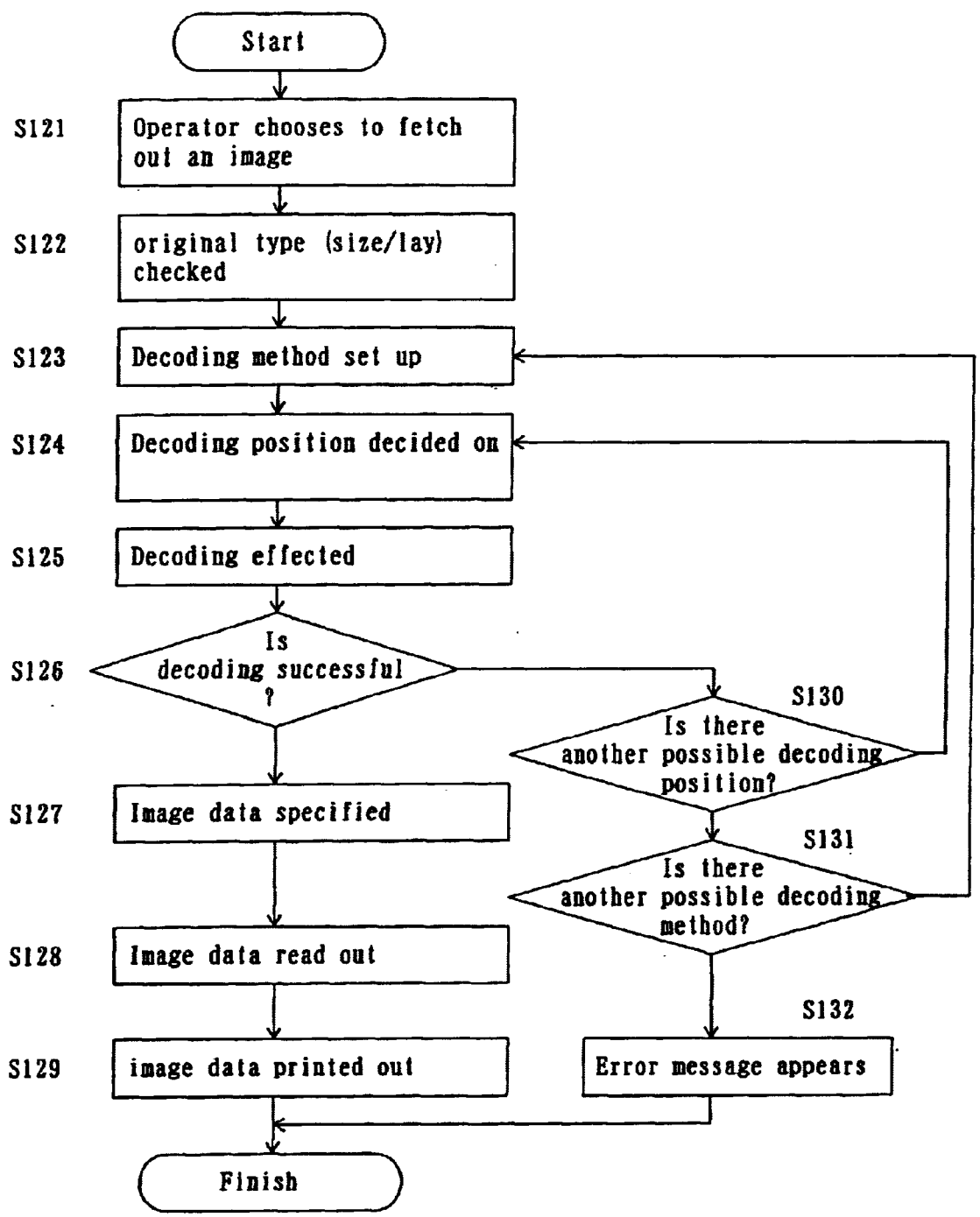
FIG. 3 is a flowchart showing the process of fetching out an image" in Embodiment I.

Meantime, the original copy size detection means 102b examines the type (size and lay) of the original placed on the original copy reading means 102a and refers the finding to the first positioning means 11a FIG. 3, Step S 122).

Now, an example of the case where a A4 size original is placed on the original copy reading means 102a portrait-wise as seen from the operator's position will be described in the following. The first positioning means 11a refers to the first position information table T1a, and provides the input control means 4 with the position information on the priority numerical order of positions for the writing in of the document ID—lower left, upper right, lower right and upper left in that order on a paper equivalent to the original A4 size placed portrait.

The process of deciding on a position from which the ID mark is to be read out is the same as the process of deciding on a position to write the ID mark in described in the "process of filing the image". It can be said, therefore, that the order of the positions named as possible reading out space is most likely to be identical with that of the positions proposed as possible space for the writing in of an ID mark.

In the next step, the start button on the operation panel 101a is pressed, and then the panel control means 101b instructs the input control means 4 to read in the image. The input control means 4 in turn instructs the original copy reading means 102a to read the positions given by the first positioning means 11a, that is, the position corresponding to the lower left, upper right, lower right and upper left in the original A 4 size placed portrait-wise. The original copy reading means 102a reads in those positions—lower left, upper right, lower right and upper left while masking the other area. The original copy reading means 102a then digitalizes and stores the readings in the buffer 104.

The decoding means 111 then cuts the first possible position lower left out of the image data stored in the buffer 104 and decodes the ID mark in the lower left position. The decoding is carried out in the procedure specified by the decoding management means 13 which will be described later (FIG. 3, Steps S 123–S 124–125).

If the decoding is successful, that is, if a document ID for the ID mark is obtained, the decoding means 111 notifies the document image managing means 103 of the document ID. The document image managing means 103 refers to the first attribute table T2a according to the document ID and finds the storage location in the image data file F1a corresponding to the document ID through the pointer information. Finding the storage location, the document image managing means 103 reads out the image data file F1a onto the buffer 104. The read out image data is printed out by the image outputting means 109 with the "process of taking the image data" coming to a close (FIG. 3, Steps S 126–S 129).

If the decoding attempt fails, the decoding means 111 cuts the second possible position upper right out of the image data stored in the buffer 104 and attempts to decode the ID mark at the upper right position (FIG. 3, Steps S 126–S 130–S 124–S 125).

The decoding attempt is repeated until an ID mark is found. If the decoding of the last possible position lower right produces no results, the decoding means 111 tries another decoding method according to the directions from the decoding management means 13 (FIG. 3, Steps S 130–S 131–S 124–S 125).

A switch from one decoding method to another is effected by changing decoding programs among a plurality of programs (decoding information Pd) previously stored in the storage means.

After switching to another decoding method, the decoding means 111 again cuts the first possible position out of the image data stored in the buffer 104 and attempts the decoding. The decoding means 111 repeats the process until an ID is found. If the decoding attempt at the lower right position fails, the decoding management means 13 directs the decoding means 111 to still another decoding method.

Decoding methods are changed until the decoding is successful. In case all the decoding methods available fail, an error message appears on the operation panel 101a with the "process of filing the image" coming to an end (FIG. 3, Step S 132).

The possible causes for the failure in decoding attempts are varied including a tilted ID mark, noise in the ID mark and an enlarged or reduced mark. To have decoding programs in preparation for such cases could raise the success rate of decoding.

Also, if it is so arranged that the decoding methods are to be tried in order of increasing decoding precision, that is, increasing degree of algorithm, the decoding speed could be raised with ideal ID marks.

Figure 4:
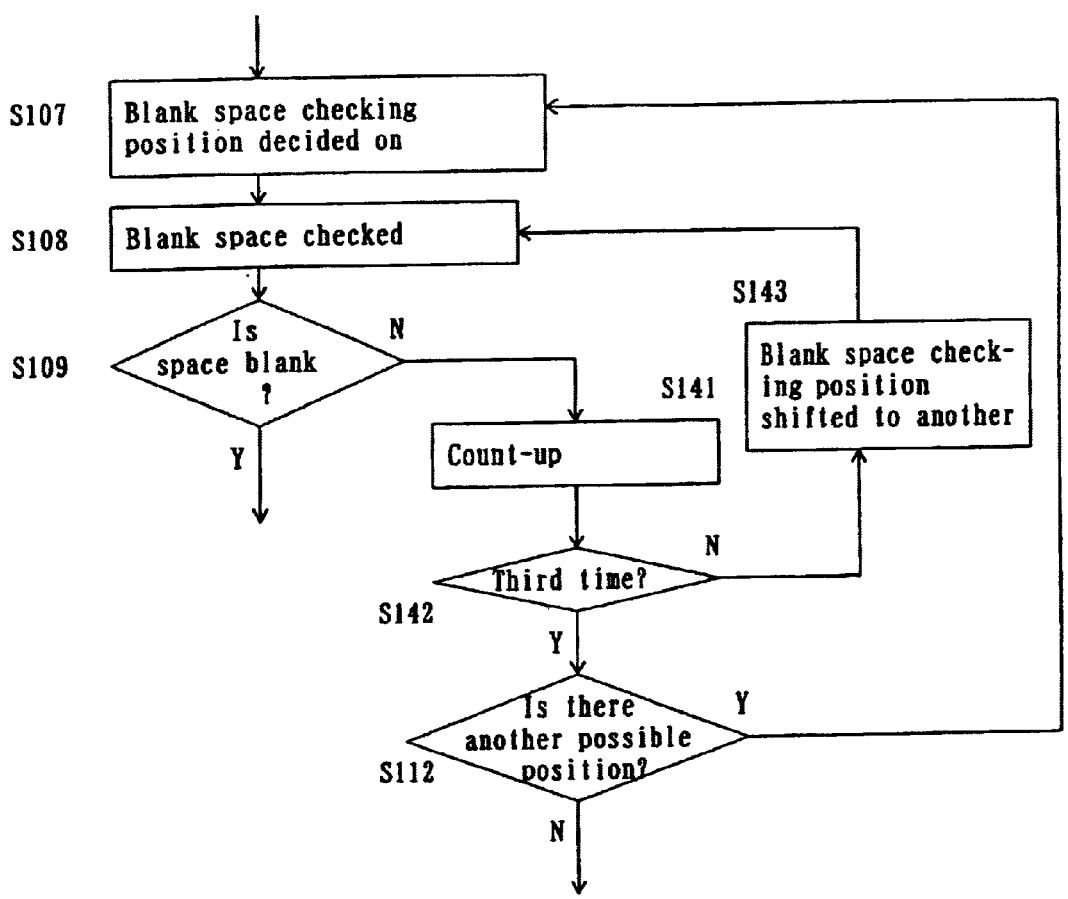
FIG. 4 is a flowchart showing the process of checking the space in Embodiment I.

In this embodiment, if the space checking means 6 finds the space not to be blank, the next possible position will be checked at the direction of the first positioning means 11a. It may be so arranged that a space a certain distance away from the failed position will be checked before that. In this regard, in case the space is found not to be blank in Step S 109, the space checking means 6 moves the position by, say, 5 dots to left and checks the space there as shown in FIG. 4. If the new position is found not to be blank, the checking position is moved by 5 dots to left again and checked to see if it is blank. In case this position is not blank, either, the process indicated in FIG. 2 is followed (FIG. 4, Steps S 141–S 142–S 143). Needless to say, in case such space checking is performed, the decoding of the document ID is also performed that way in the process "of fetching out the image in consideration of that".

In the embodiment just described, it is understood that the size of the original to be printed out by the image outputting means 109 in the "process of filing the image" is the same as that of the original set on the original copy reading means 102a. In such an image data processing apparatus, however, the operator can freely choose the printing size. That procedure is followed this way: When he or she chooses the process of filing the image on the operation panel 101a, the operator inputs instructions about the size of printing by the image outputting means 109. The printing size inputted is then conveyed from the panel control means 101b to the first positioning means 11a and the input control means 4. The first positioning means 11a decides on the ID mark integration position according to the printing size. In this regard, when instructed about the printing size from the operation panel 101a, the first positioning means 11a decides on the position for the ID mark on the basis of not the type of the original found by the original size detection means 102b but the printing size inputted from the operation panel 101a. In the "process of fetching out the image", too, that positioning procedure is followed.

That filing can be performed alone or along with copying, facsimile reception/transmission or transferring to the computer. In case an image is copied and at the same time registered in the storage means 105, the original copy reading means 102a is used as image data inputting means 102 as described. The ID mark is placed on the first page and outputted by the image outputting means 109. And the ensuing pages are read by the original copy reading means 102a and outputted without the ID mark from the image outputting means 109. At the same time, the filing in the storage means 105 is effected as described.

In facsimile reception and outputting on printing instructions from the computer, too, the first page, with the ID mark inscribed therein, and the ensuing pages are outputted. At the same time, the image data is registered in the storage means 105. In case the image data is registered in the storage means 105 along with facsimile transmission, the ID mark is placed on the first page and is outputted by the image outputting means 109. The other pages will not be outputted.

As set forth above, the operator does not have to think of where the bar code is in the original and there is no possibility of part of the contents being overwritten on the bar code in the embodiment according to the present invention. That is, the present invention provides an apparatus for image data processing which permits more accurate and speedier fetch of image data.

To Attain the Second Object:

Embodiment II-1

Figure 5:
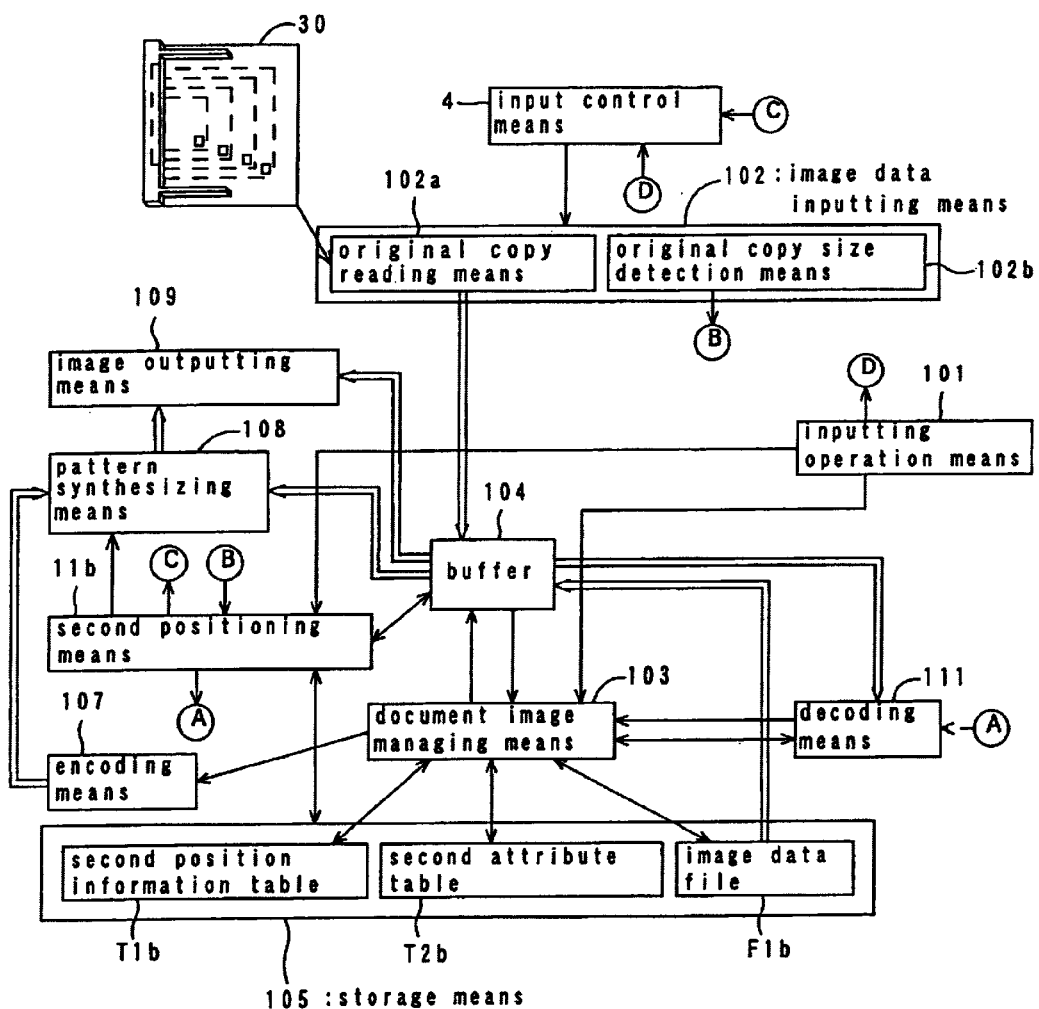
FIG. 5 is a block diagram of the apparatus for image data processing in Embodiment II-1.
Figure 6:
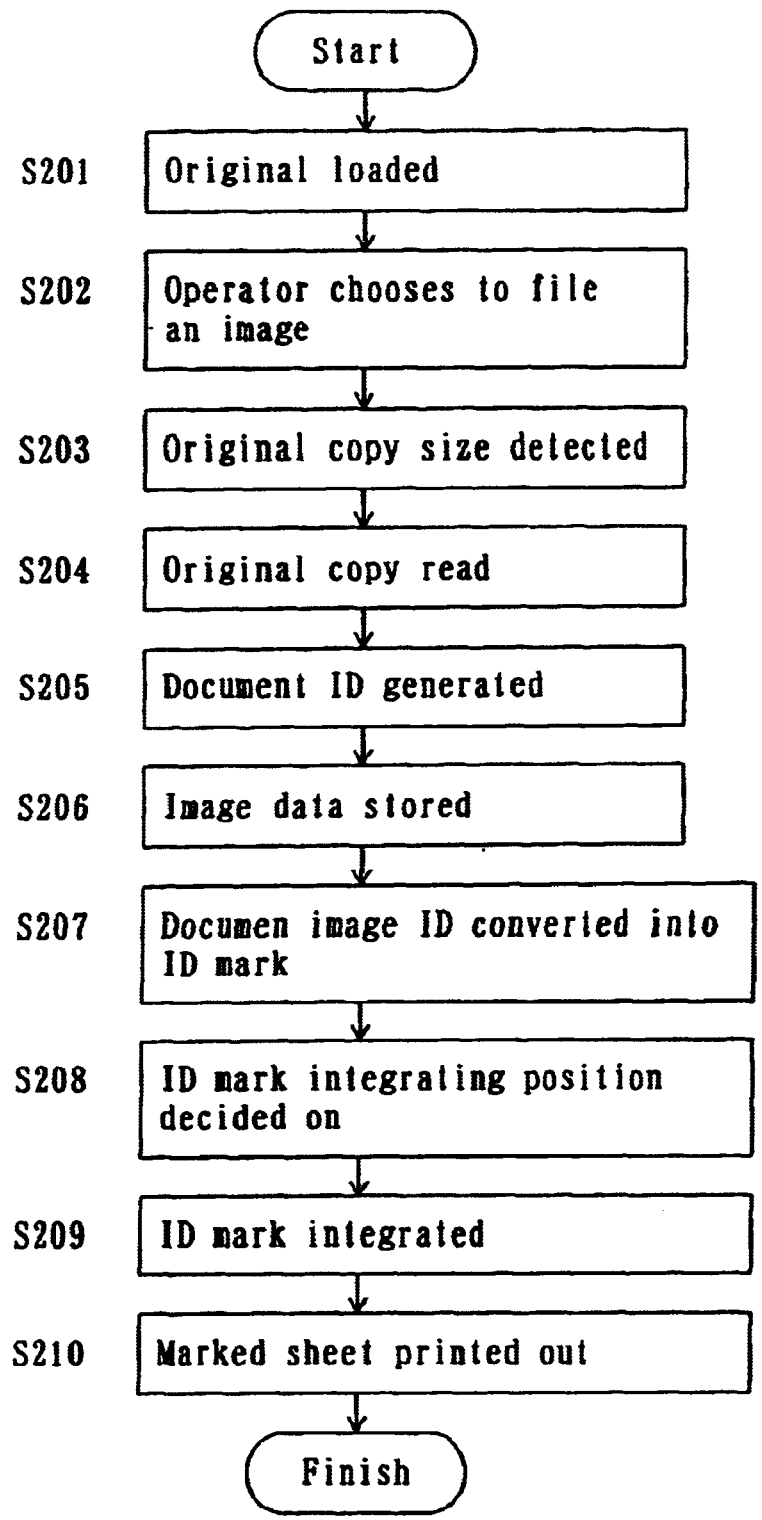
FIG. 6 is a flow diagram showing the filing procedure in Embodiment II-1.

FIG. 5 is a schematic functional block diagram of the apparatus for image data processing in Embodiment II-1. FIG. 6 is a flow diagram showing that process.

The operation of the embodiment will be explained along with the configuration of the apparatus.

In FIG. 5, the double line indicates the flow of main image data, while the arrow with solid line indicates the flow of other data or control signals.

Filing of Image Data

Figure 7:
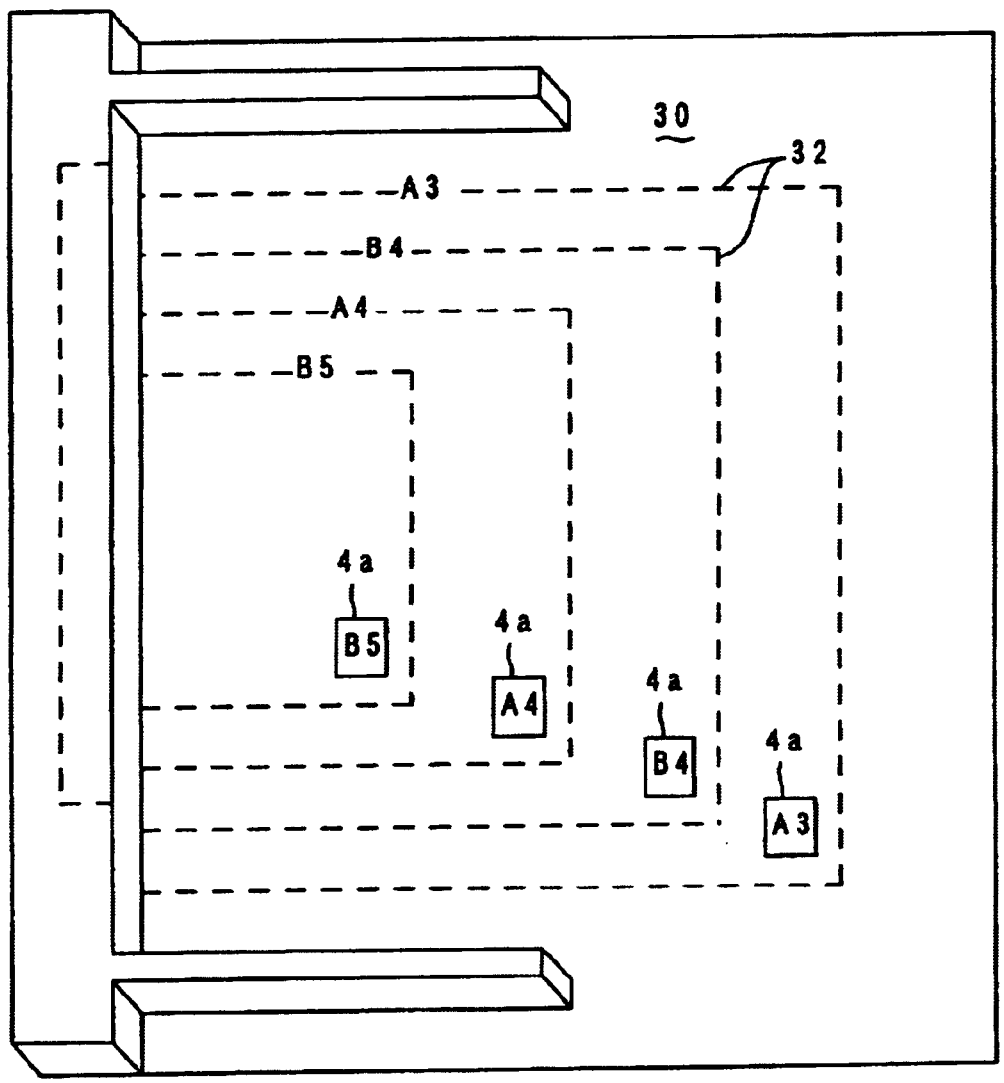
FIG. 7 is a detail view of the original plate of a reading table.

As shown in FIG. 7, the document plate of the original copy reading means 102a in the image data inputting means 102 has guide frames drawn thereon which correspond to the respective standard original copy sizes. At a specific position on each guide frame is drawn a simulation mark 4a. The simulation mark 4a indicates to the operator the position where the bar code is integrated in the marked sheet. In the case of FIG. 7, the ID mark is shown at the lower left of the original placed, the right side down, with its top and bottom lines parallel with the feeding direction of the original copy reading means 102a.

The operator decides on the position to print the ID mark at, taking into consideration of the size and lay. Throughout this specification, it should be understood, the lay of the original put on the document plate with the short sides horizontal is called portrait while the lay with the long sides horizontal is named landscape. The operator then puts the original on the document plate in such a way that the position to print the ID mark in comes on the simulation mark (FIG. 6, Step S 201).

With the operator pressing the start button, the filing process begins. The subsequent process is identical with that shown in FIG. 2, and the description will not be repeated of the process including the steps of reading the original, filing in the storage means 105, issuing an document ID, forming an ID mark on the basis of the document ID (FIG. 6, Steps S 202–S 207).

But it should be noted that the first attribute table T2a in FIG. 1 is named second attribute table T2b and the first image data file F1a in FIG. 1 is called second image data file F1b in this embodiment.

Meanwhile, the image data inputting means 102 is also provided with an original copy size detection means 102b which can detect the length of the sides in the feeding direction of the original placed on the document plate 30 and the width or the length of the sides perpendicular to the feeding direction. Therefore, in which direction the standard size original is placed on the document plate is also detected.

The original copy size detection means 102*b* detects the size of the original copy (the length of the sides in the feeding direction and that perpendicular thereto) before or in parallel with the step of reading the image data, and then notifies the second positioning means 11*b* of the findings (FIG. 6, Step S 203). Notified of the size of the original, the second positioning means 11*b* refers to the second position information table T1*b* and extracts an ID mark position for the original copy size, which is then notified to the image pattern synthesizing means 108 (FIG. 6, Step S 208).

The second position information table T1*b* has the possible positions to print the ID mark at registered for the respective original copy sizes as shown in Table 2. In this regard, the positions of simulation marks 4*a* within the guide frame 32 drawn on the document plate are filed in coordinates with the upper left as origin. The second positioning means 11*b* extracts a position from the second position information table T1*b* and inputs it in the image pattern synthesizing means 108.

TABLE 2

| Original copy size/lay | Position | Coordinates |
| --- | --- | --- |
| A4/portrait | Lower left | XxxxxYxxxx |
| A3/portrait | Lower left | XxxxxYxxxx |
| A4/landscape | Lower right | XxxxxYxxxx |

As shown, the image pattern synthesizing means 108 receives the image data, ID mark and mark-integrating position information, and integrates the ID mark at the mark-integrating position, generating an image with the mark inscribed therein, that is, a marked sheet. The image outputting means 109 then prints out the marked sheet (FIG. 6, Steps S 209–S 210).

In the filing process, a marked sheet with a bar code integrated at the lower left can be generated by placing the original on the guide frame with care taken so that the simulation mark comes under that position as described above.

In this embodiment, it is so configured that the original copy size detection means 102*b* is provided as means for detection of the image size. Instead, the operator may visually note the type of the original and input the information, say, A4/portrait from the inputting operation means 101.

It is pointed out that the step of detecting the size shown in FIG. 2 (Step S 106) is identical with that in FIG. 6 (Step S 203) in substance but is placed at a different point of process. The difference is whether the detection of the original copy size is done before or during the reading step. Either way serves the purpose.

Process of Fetching out an Image Data

Now, the process of fetching out an image data represented by the ID mark printed on the mark sheet from the storage means 105 will be explained with reference to the flow chart shown in FIG. 8.

Figure 8:
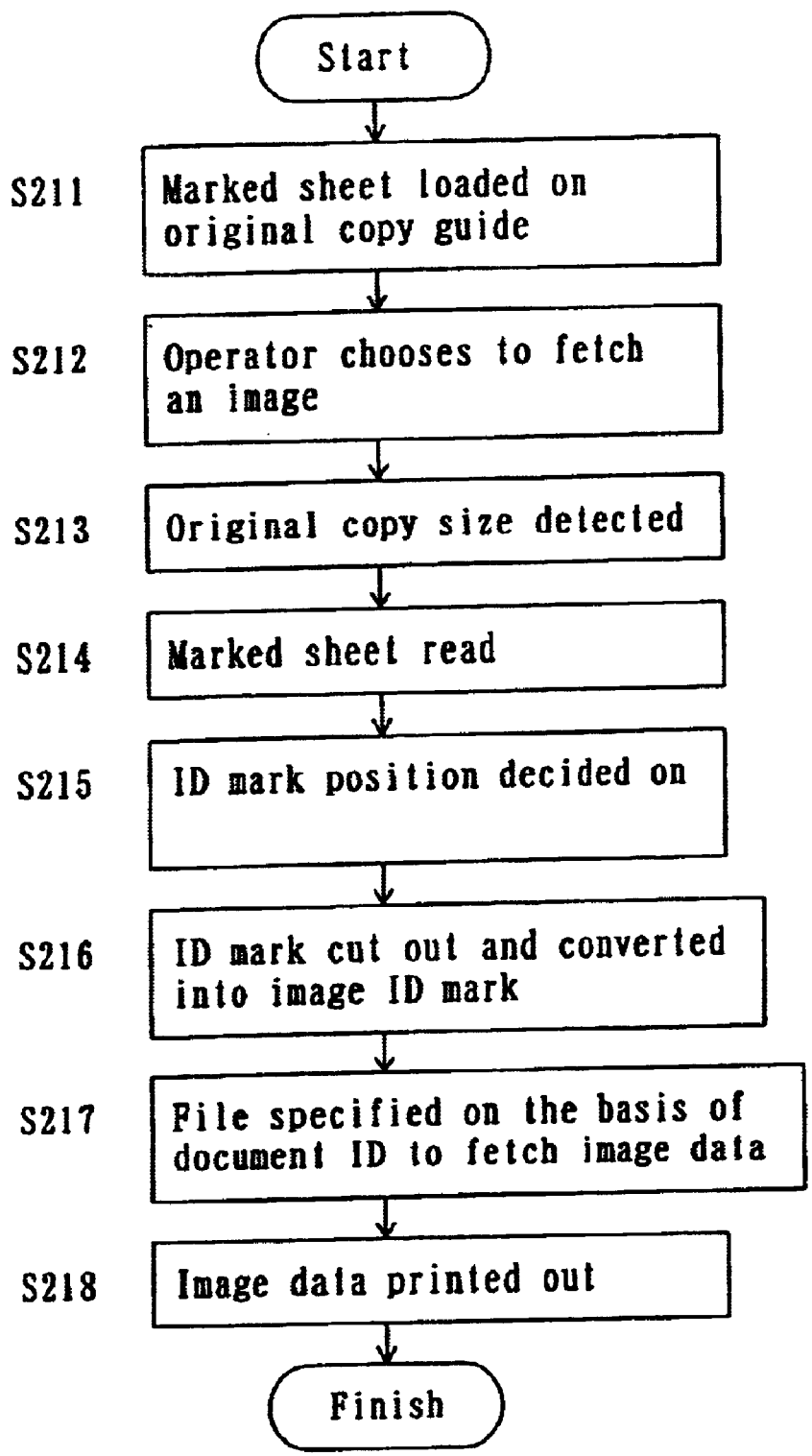
FIG. 8 is a flow diagram showing the procedure of fetching out data in Embodiment II-1.

The operator first puts a marked sheet to be read out on the document plate 30 of the image data inputting means 102 in such a way that the position of the ID mark on the marked sheet comes on the simulation mark 4*a* on the guide frame 32 (FIG. 8, Step S 211).

The operator chooses the process of fetching out an image data represented by the marked sheet placed on the image data inputting means 102 through the inputting operation means 101. The start button pressed, the original copy reading means 102*a* starts up to read the contents on the marked sheet and stores the results in the buffer 104 (FIG. 8, Steps S 212–S 214).

Before or in parallel with the reading step, on the other hand, the original copy size detection means 102*b* reads out the size of the marked sheet and detects the original copy size (FIG. 8, Step S 213). The detection results are conveyed to the second positioning means 11*b*. So notified, the second positioning means 11*b* refers to the second position information table T1*b* in the storage means 105 on the basis of the detection results from the original copy size detection means 102*b* in the same way as in the filing process. The second positioning means 11*b* then detects the position where the ID mark is made and notifies the decoding means 111 of the detected position (FIG. 8, Step S 215).

The decoding means 111 reads out and decodes the ID mark at the corresponding position in the image data stored in the buffer 104 on the basis of the position information thus obtained. That is, the ID mark is converted into a document ID (FIG. 8, Step S 216).

The decoding means 111 notifies the document image managing means 103 of the document ID thus obtained. On the basis of this document ID, the document image managing means 103 refers to the second attribute table T2*b* and acquires pointer information. On the basis of this pointer information, the document image managing means 103 reads out the corresponding image data from the second image data file F1*b* onto buffer 104.

Further, the image data thus read out is printed out by the image outputting means 109, bringing to a close the process of "fetching out the image data" (FIG. 8, Step 217–S 218).

As explained, all that is to be done is to place and read the marked sheet with a bar code thereon. And the image data represented by the marked sheet can be read out. The image data can be found out accurately and quickly.

In the aforesaid process of fetching out the image data, of course, the inputting operation means 101 can be used as means for detection of the image size just as in the filing process.

In case an ID mark needs to be inscribed on the image to be outputted, the document ID issued by the document image managing means 103 is converted into an ID mark through the decoding means 111, which is then integrated in the image data by the image pattern synthesizing means 108 and printed out.

Figure 9:
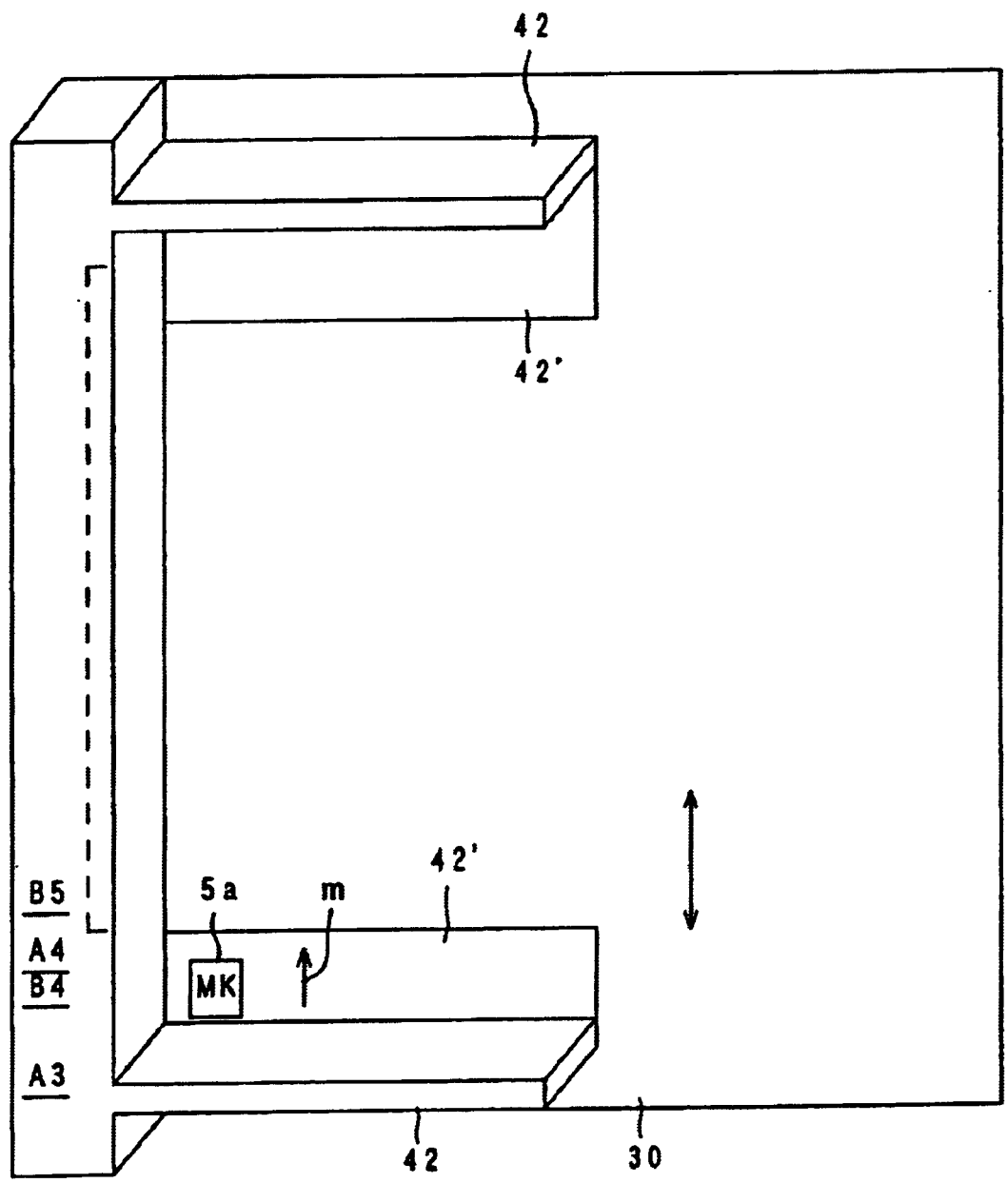
FIG. 9 is another detail view of the original plate of a reading table.

In this embodiment, the positioning marking that includes guide frames and simulation marks has been described. Instead, it may be so configured that the positioning may be effected using a position matching arrangement including a pair of original copy size regulating sliders 42 and a simulation mark 5*a* provided thereon as shown in FIG. 9. In the position matching arrangement, the operator puts the original copy on the document plate 30 taking care that the ID mark will be printed at the position of the simulation mark. Level plates 42' under the pair of original copy size regulating sliders 42 as shown in FIG. 9 are made of thin plastic plate or the like. The original plate shown in FIG. 9 is also so arranged that the operator standing at the lower part of FIG. 9 places the marked sheet with the right side up and with the ID mark at the lower left over the simulation mark. An arrow m to indicate the direction of the top may also be marked as shown in FIG. 9.

In the configuration using the guide frames 32 with simulation marks 4*a* therein or the arrangement using a pair of original copy size regulating sliders 42 with a simulation mark 5a thereon, the position of the simulation mark serves merely as a guide to the operator, because the ID mark position corresponding to the simulation mark is actually determined on the second position information table T1b.

Embodiment II-2

Figure 10:
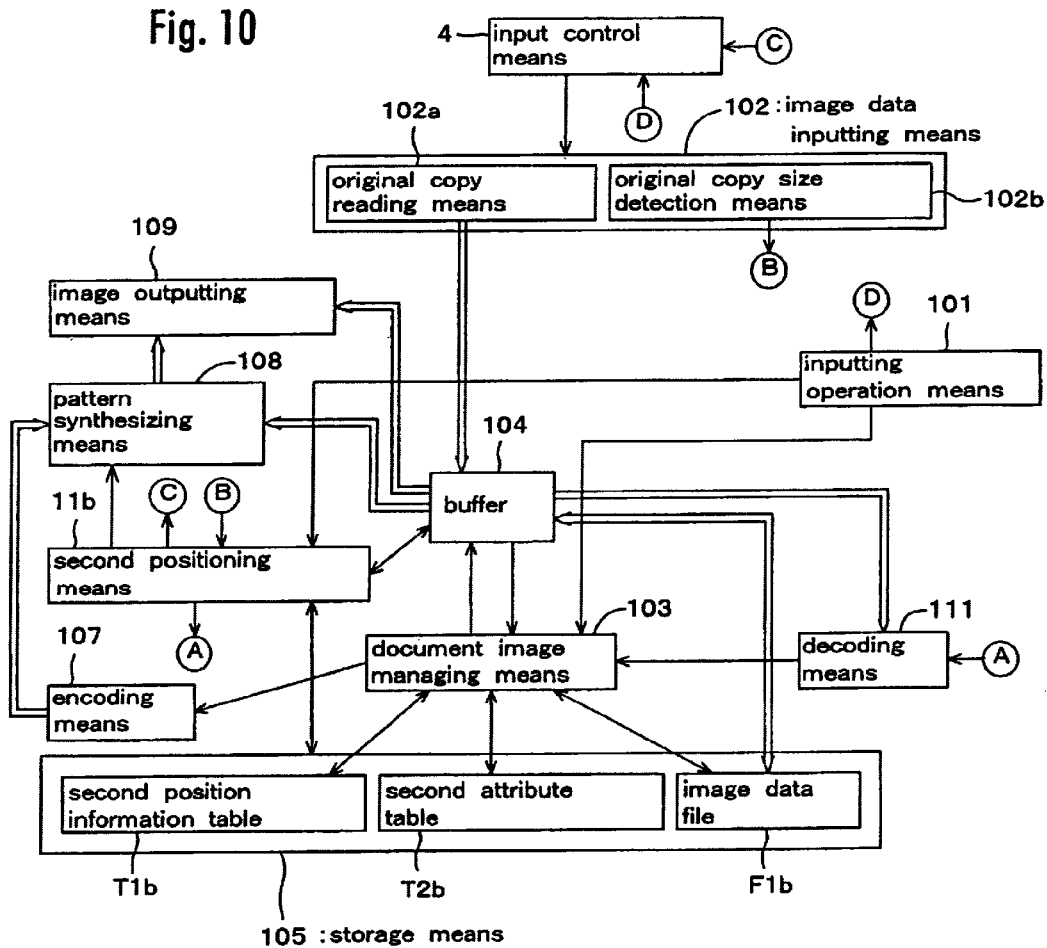
FIG. 10 is a block diagram of the apparatus for image data processing described in Embodiment II-2.

In the preceding embodiment, it is arranged that a simulation marking is provided on the document plate 30 of the scanner or on the original copy size regulating sliders 42. It is also possible to so arrange that various kinds of information are inputted manually through a touch panel or a number of keys. That is, the position to print the ID mark at may be inputted by this inputting operation means as w ill be described in the following Filing FIG. 10 is a functional block diagram illustrating this embodiment, while FIG. 12 is a flow chart showing the process thereof.

Now, this embodiment will be described with reference to FIG. 10 and FIG. 12.

Figure 11:
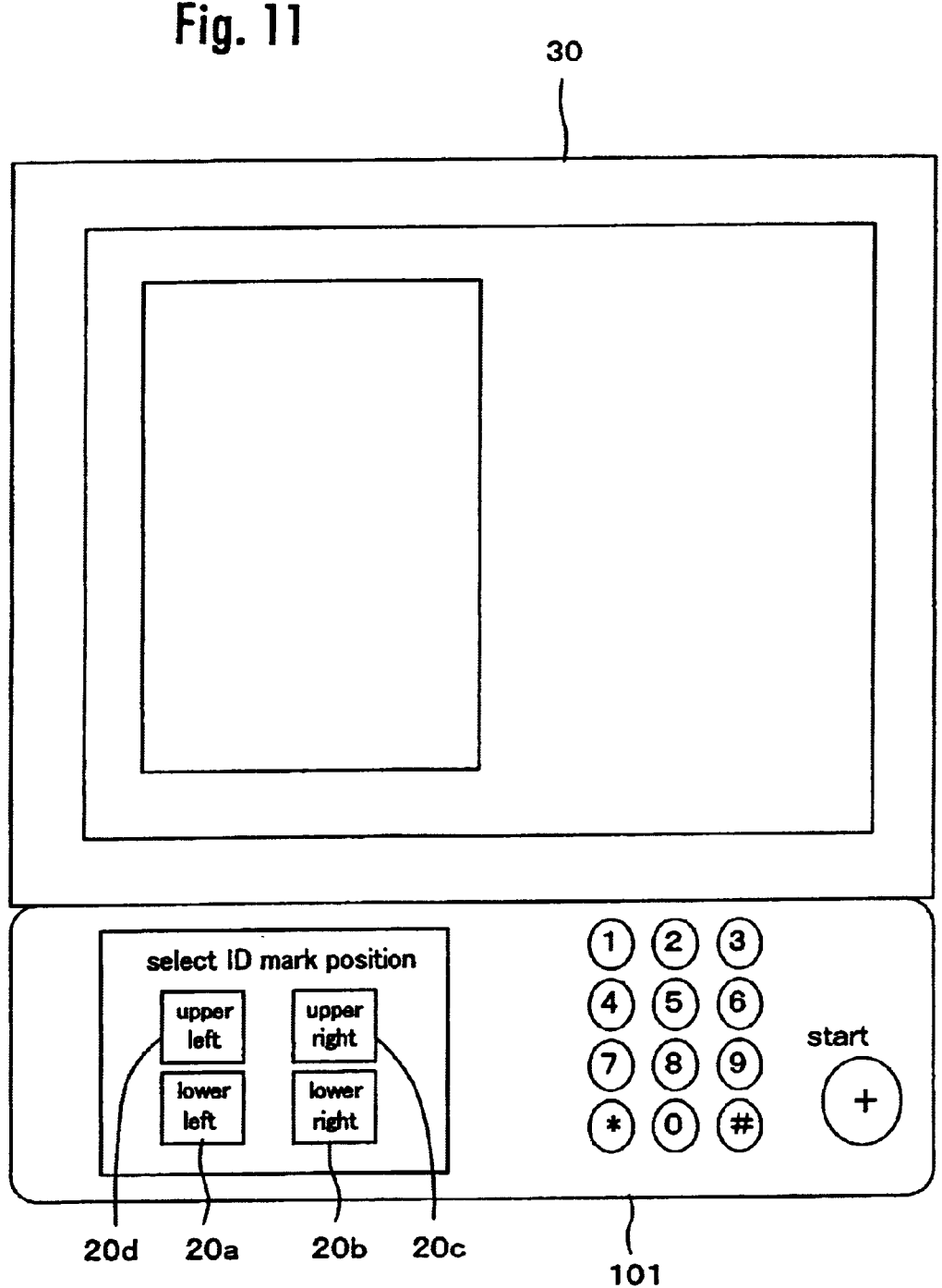
FIG. 11 is a conceptional diagram showing an example of the inputting operation means in Embodiment II-2.
Figure 12:
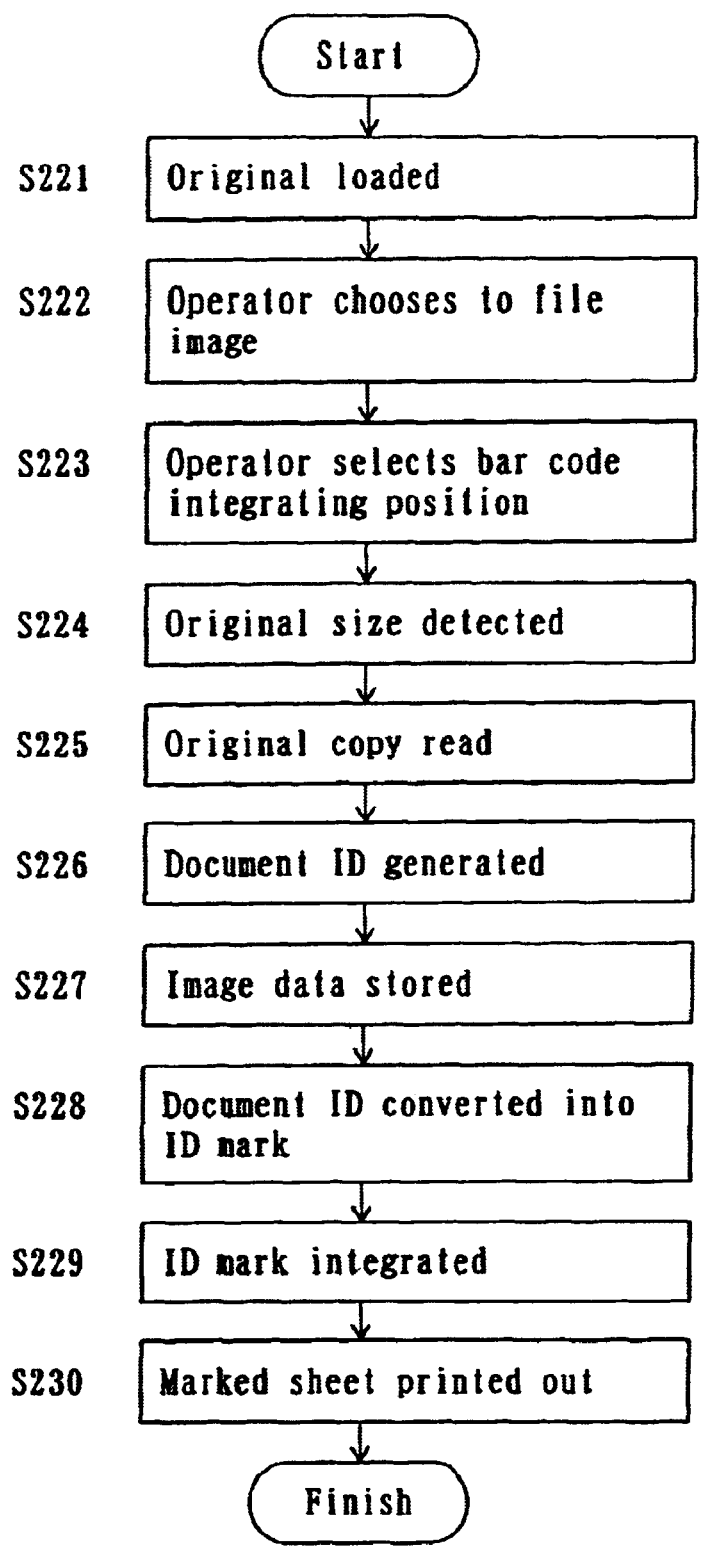
FIG. 12 is a flow diagram showing the filing procedure in Embodiment II-2.

First, the operator puts the original copy to be read on the document plate 30 of the original copy reading means 102a (FIG. 12, Step S 221). Then, the operator selects the "filing" of the image, and there will appear position buttons 20a to 20d on the touch panel as an inputting operation means 101 as shown in FIG. 11. Those four position buttons 21a to 20d represents the respective spaces on the original copy—lower left, upper right, lower right and upper left.

The operator presses one of the four position buttons representing the position intended for the ID mark and then the start button to start the reading of the original. Before the reading, need less to say, the original copy size detection means 102b is activated to detect the size of the original (FIG. 12, Steps S 221–S 224).

The subsequent steps are about the same as those in the preceding embodiment II-1. In this regard, the original image read by the original copy reading means 102a is filed in the storage means 105 through the buffer 104. At the same time, the image data is given an attribute data including the document ID and managed by the document image managing means 103. The document ID given by the document image managing means 103 is encoded into an ID mark by the encoding means 107 and inputted in the image pattern synthesizing means 108.

Meanwhile, information on the ID mark position inputted from the inputting operation means 101 and information on the size of the original copy obtained from the original copy size detection means 102b are inputted in the second positioning means 11b. This second positioning means 11b decides on the ID mark position, referring to the second position information table T1b. The second position information table T1b has the positions represented by the position buttons 20a to 20d enumerated for a different original copy size as shown in Table 3.

TABLE 3

| | Button Position | Coordinates |
|---|---|---|
| A4/portrait | Lower left | XxxxxYxxxx |
| | Upper right | XxxxxYxxxx |
| | Lower right | XxxxxYxxxx |

TABLE 3-continued

| | Button Position | Coordinates |
|---|---|---|
| A4/landscape | Upper left | XxxxxYxxxx |

The position thus chosen is referred to the image pattern synthesizing means 108, which prints out a marked sheet with the ID mark inscribed therein at the specific position chosen on the image data obtained from the buffer 104 (FIG. 12, Steps S 225 to S 230).

Instead, the operator may visually note and manually input the original copy size on the inputting operation means 101 as in the preceding embodiment II-1.

Fetching Out

There will now be explained the process of fetching out the image data filed in the above-mentioned configuration.

The operator notes the ID mark position on the original image and presses the key for that position. Other than those steps, the process is the same as that in embodiment II-1. The following description is confined to those different steps.

First, the operator visually notices the ID mark position on the marked sheet and puts the marked sheet on the document plate of the original copy reading means 102a. The operator then selects the key for the noticed ID mark position among the four position keys 20a to 20d on the touch panel representing "lower left", "upper right", "lower right" and "upper left", and presses the start key to start the process.

Then, the original copy reading means 102a reads the marked sheet and stores information in the buffer 104. At the same time, the second positioning means 11b, referring to the second position table T1b, determines the ID mark position and notifies the decoding means 111 of the determined position. Notified of the ID mark position from the second positioning means 11b, the decoding means 111 converts the ID mark provided at that position into a document ID, which is then handed over to the document image managing means 103.

The document image managing means 103 extracts the image data represented by the document ID from the storage means 105, which is then outputted by printing If the ID mark is needed on the image to be printed out, the document ID issued by the document image managing means 103 is converted into an ID mark through the decoding means 111, which is integrated on the image data by the image pattern synthesizing means 108 and printed out.

In the present embodiment 11-2, the respective position keys 20a to 20d are displayed on a panel touch as inputting operation means 101. Needless to say, the inputting operation means 101 is not limited to that and may be mechanical keys.

Embodiment II-3

Figure 13:
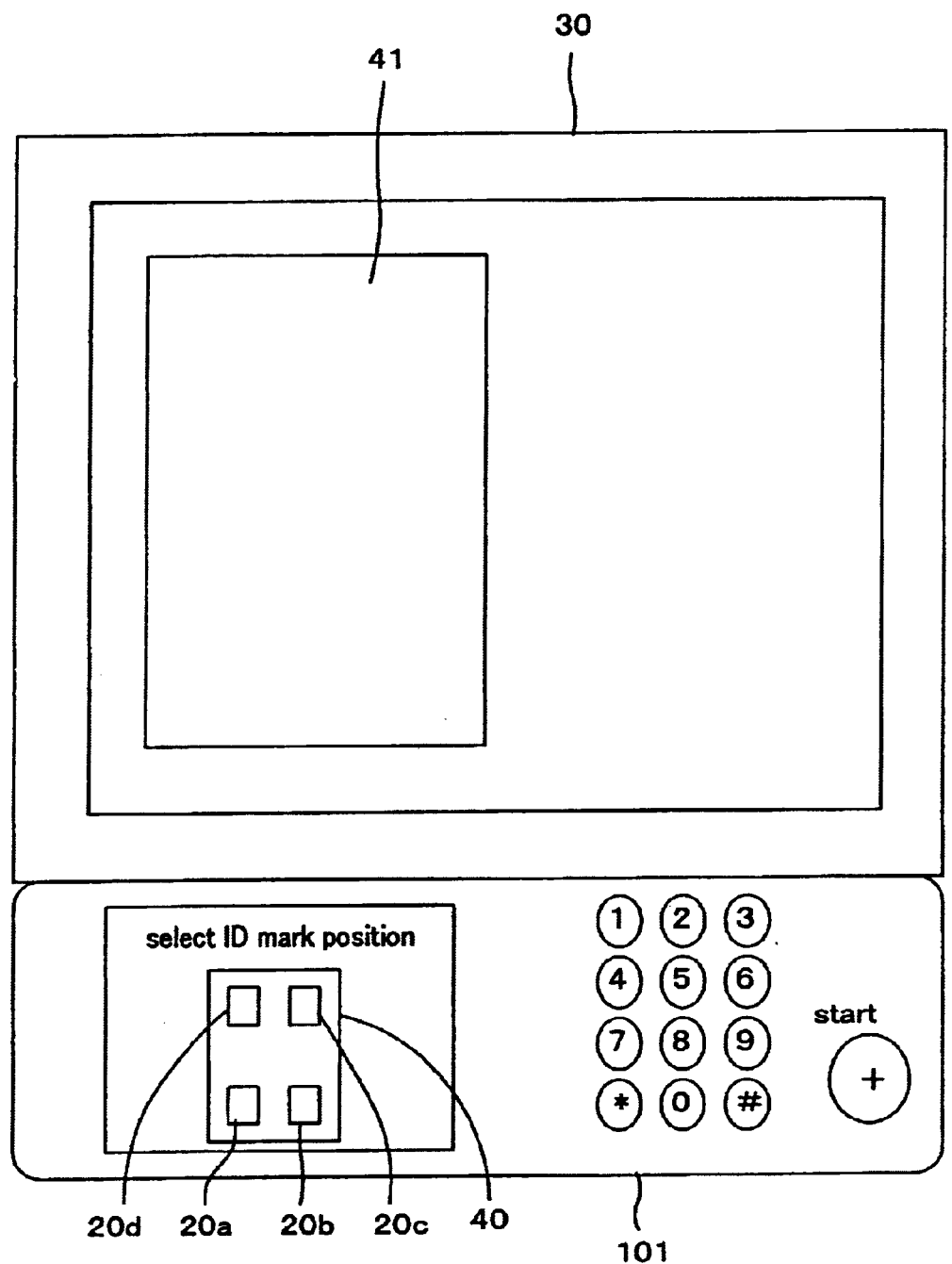
FIG. 13 is a conceptional diagram showing an example of the inputting operation means in Embodiment II-3.

In FIG. 13, when the operator puts the original image paper in such a way that the letters stand right as the operator faces, the short side lines of the original image paper are parallel with the feeding direction if it is a portrait image, and the long side lines are parallel with the feeding direction if it is a landscape image. The original copy detection means 102b can detect the length of the sides of the original image paper in the feeding direction and the length of the sides perpendicular thereto, that is, the lay of the original copy on the document plate as mentioned earlier.

Under that arrangement, the four position keys 20a to 20d in the preceding embodiment II-2 can be made further easier to handle.

Figure 14:
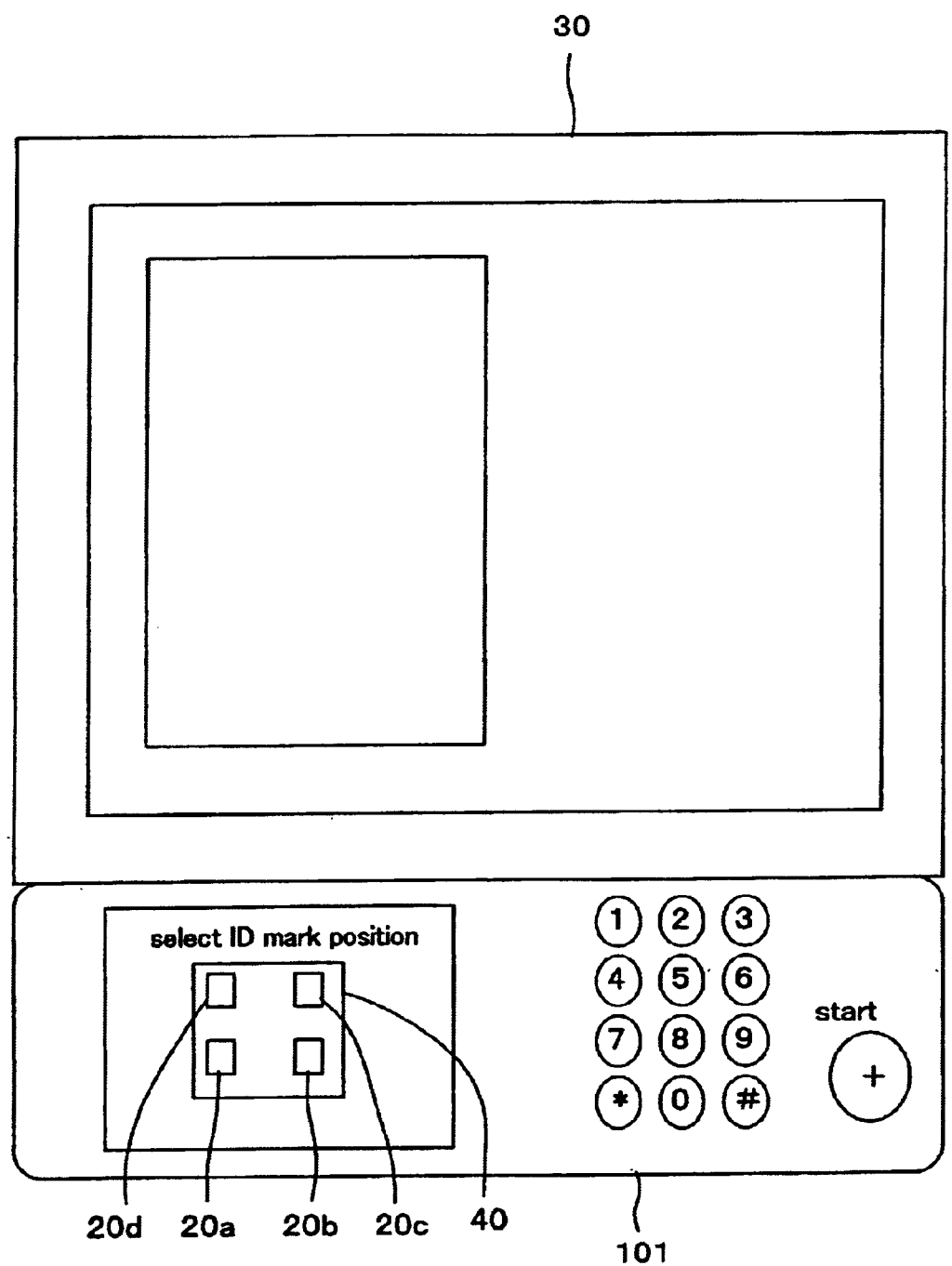
FIG. 14 is a conceptional diagram showing another example of the inputting operation means in Embodiment II-3.

In this regard, a frame 40 is displayed on the touch panel with the two short sides horizontal as seen from the operator's position as shown in FIG. 13 if the original found to be an portrait image by the original copy size detection means 102b. Within the frame 40, the four position keys 20a to 20d are also displayed. If the image is a landscape one, the frame 40 is shown with the two long sides horizontal as the operator faces, and the four position keys 20a to 20d also appear on the touch panel as shown in FIG. 14.

With that arrangement, the operator can choose the ID mark position in the light of the lay of the original copy without difficulty.

In the above description, the frame 40 is displayed on the touch panel according to the signals from the original copy size detection means 102b. It also may be so arranged as to input the original copy size as well as the lay thereof on the document plate from the inputting operation means 101 before the step of reading the image.

Embodiment II-4

Figure 15:
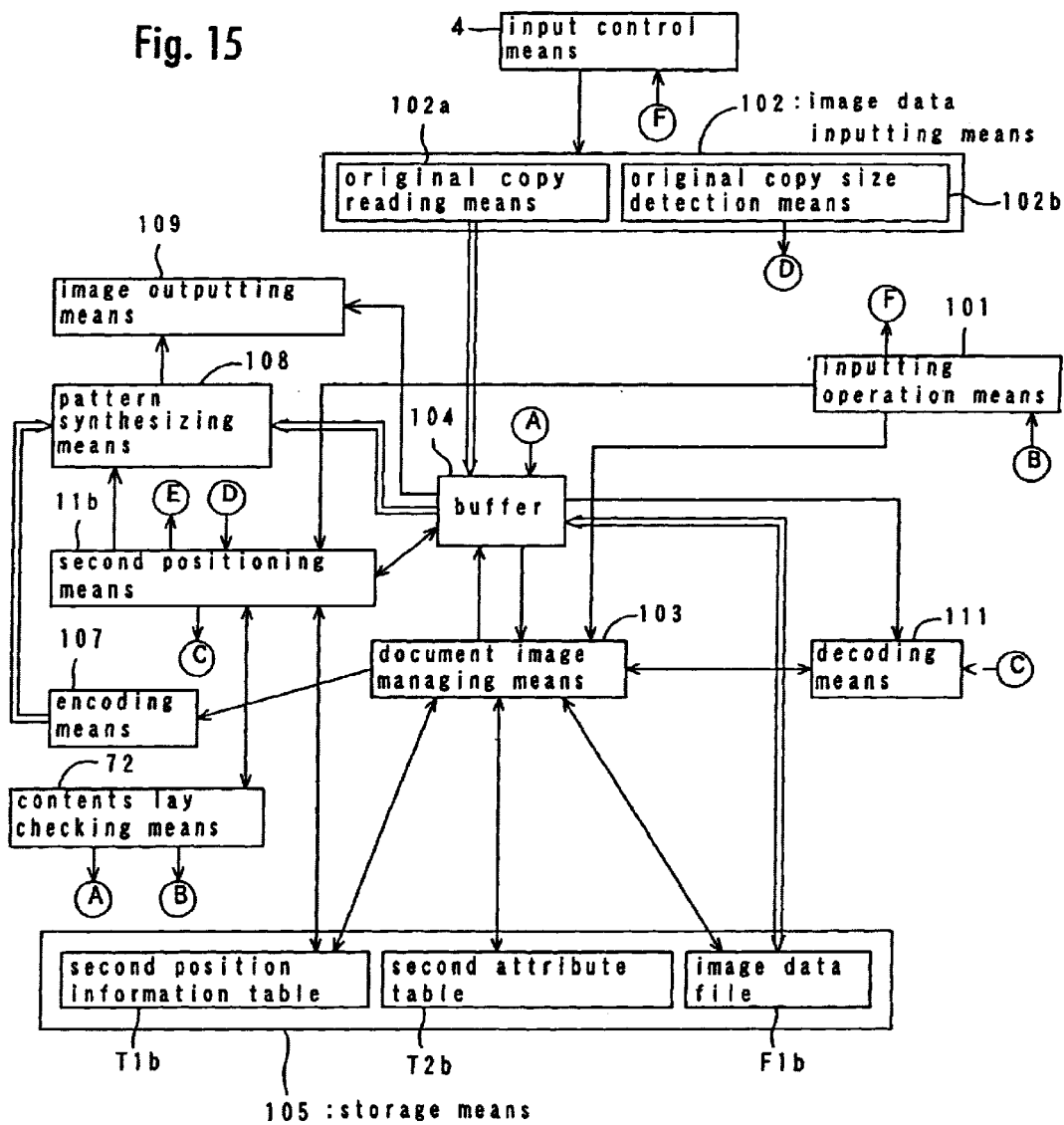
FIG. 15 is a block diagram of the apparatus for image data processing described in Embodiment II-4.

The preceding three embodiments involve the operator visually checking the size of the image and the direction of the image contents. To automatize those steps, the following arrangements can be thought of Filing In an embodiment of the present invention as shown in FIG. 15, there is provided a contents lay checking means 72 for checking the lay or the direction of the original copy in addition to the original copy size detection means 102b.

This embodiment will be explained with emphasis on the points where it is different from the preceding three embodiments.

Figure 16:
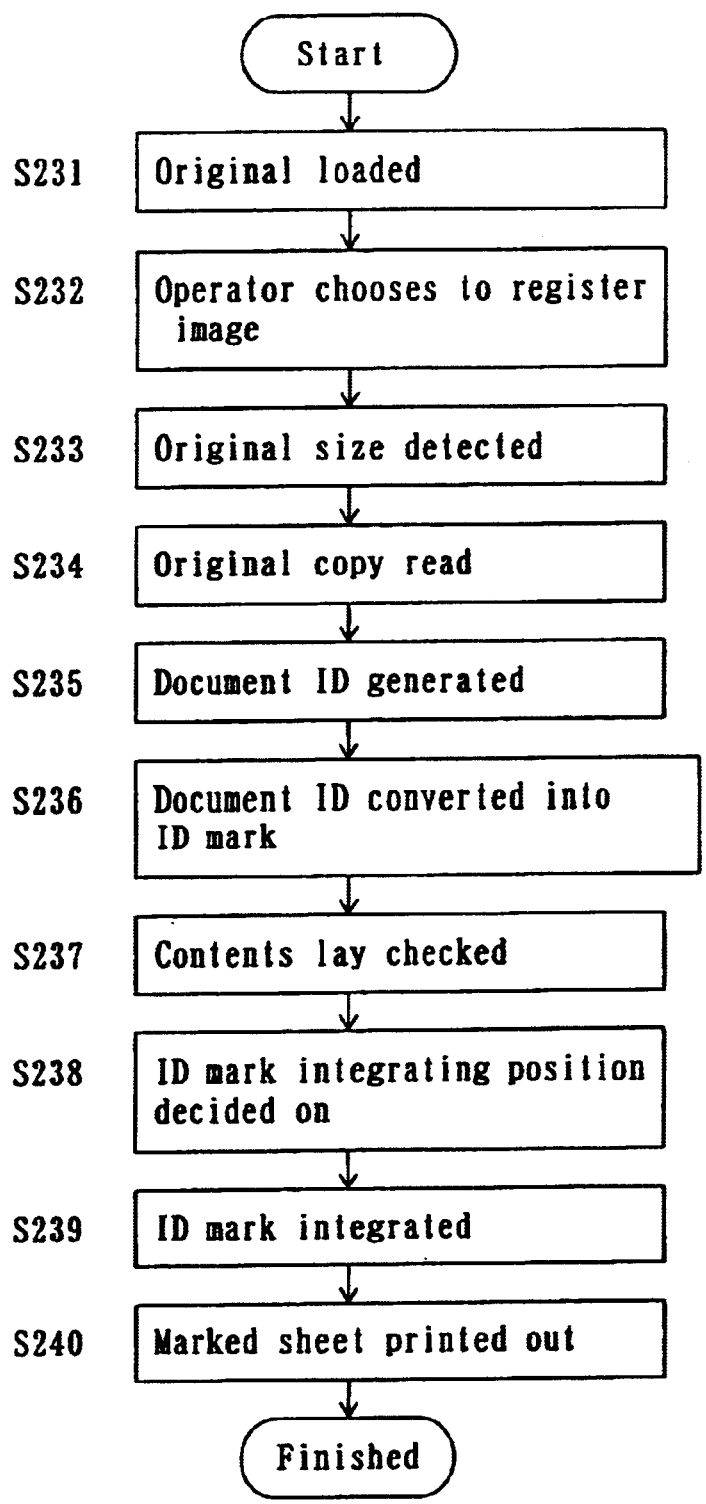
FIG. 16 is a flow diagram showing the procedure of filing image data in Embodiment II-4.

This embodiment is identical with the previous three embodiments in the process from the step of reading the original by the original copy reading means 102a to the step of the encoding means 107 encoding the ID mark. They are also the same in the process of the original copy size detection means 102b reading the size of the original (FIG. 16, Steps S 231 to S 236).

In the present embodiment, furthermore, the image data stored in the buffer 104 is read by the contents lay checking means 72, and the lay or direction of the contents of the original is judged. That is, the con tents lay checking means 72 cuts out part of the image stored in the buffer 104 and turns it, 90 degrees each time, to identify the "top or bottom" and the "right or left" (FIG. 16, Step S 237).

As in the previous two embodiments, information on the original copy size is conveyed to the second positioning means 11b from the original copy size checking means 102b. Also, information on the lay or direction of the contents of the image is notified to the second positioning means 11b. Thus, information on the original copy size and the lay of the original copy makes it possible to find which way the original copy is used, portrait-wise or landscape-wise.

Since the present embodiment permits reference to information on the lay or direction of the contents, the "top or bottom" and the "right or left" can be judged even if the original copy is not put "right" as seen from the operator's position on the document plate as in the previous embodiments.

The second position information table T1b has the ID mark positions enumerated for each original copy size and lays or direction as in Table 1. The second positioning means 11b extracts the position from the second position information table T1b and gives it to the image pattern synthesizing means 108. On the basis of this information, the image pattern synthesizing means 108 integrates the ID mark at that position, and then the image is outputted by the image outputting means (FIG. 16, Steps S 238–S 240). In this regard, the origin of the coordinates in Table 1 is the upper left of the paper. In the present embodiment, it is possible to judge the "top or bottom" and the "right or left" and there is no need to locate the origin of the coordinates at a specific position. The ID mark position can automatically be determined on the basis of the detection results by the original copy size detection means 102b and the contents lay checking means 72.

In the above description, the second position information table T1b has one position for each original copy size and lay. It may be so arranged that there are filed a plurality of positions with priority numbers given thereto for each original copy size and lay in the table so that in case the first possible position is found to contain letters or the like, the second possible position may be checked. This process is repeated until a blank position is found. In this arrangement, it is necessary to provide a means for checking the proposed position to see if it contains letters.

Fetching Out

There will now be explained the process of fetching out an image using the contents lay checking means 72.

Figure 17:
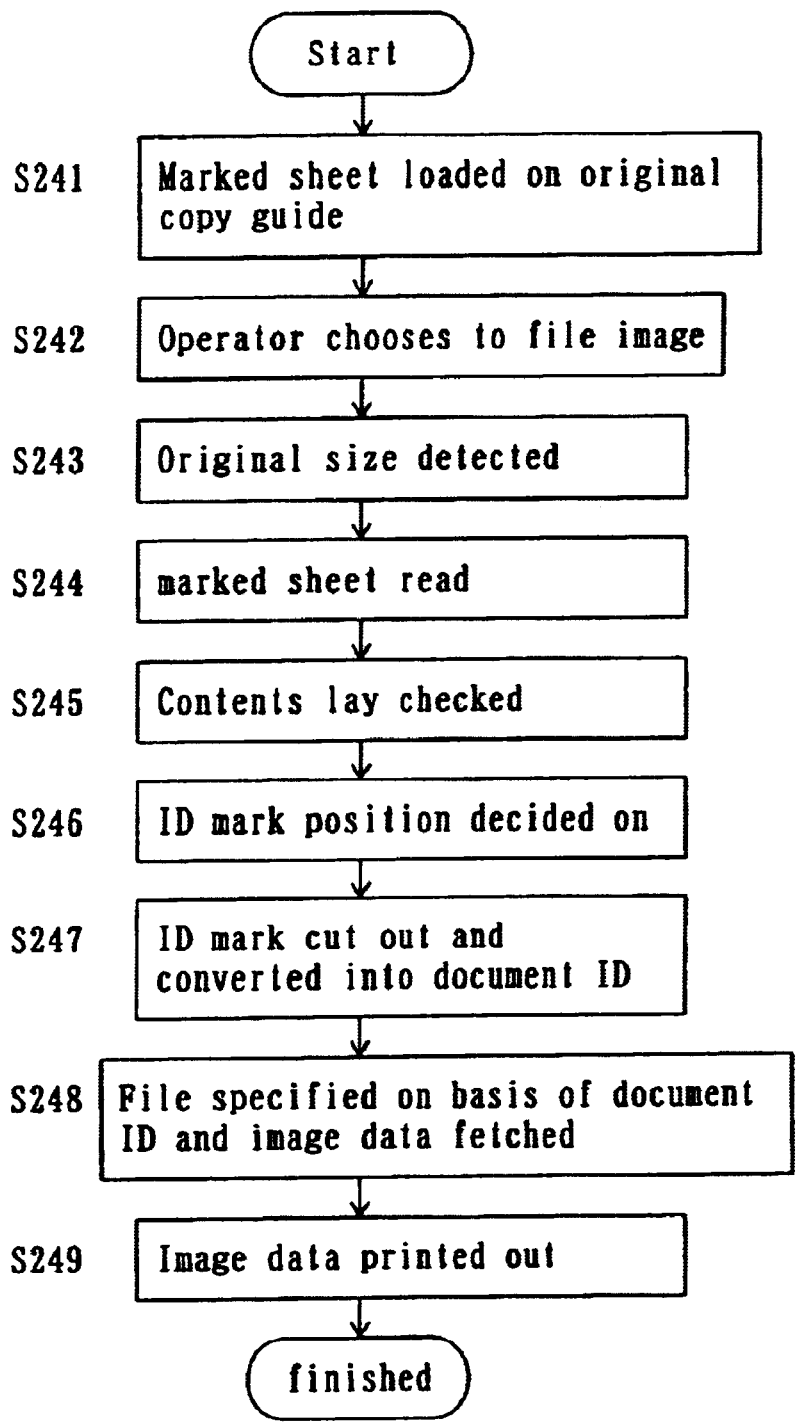
FIG. 17 is a flow diagram showing the procedure of fetching out image data in Embodiment II-4.

All the embodiments are common in the steps of putting the marked sheet on the document plate 30 to be read by the original copy reading means 102a and of the original copy size detection means 102b detecting the original copy size. Here, the procedure of checking the contents lay at the time of filing as described above is carried out to detect the contents lay or direction of the marked sheet (original) (FIG. 17, Steps S 241 to S 245).

The information thus obtained on the original copy size and lay is conveyed to the second positioning means 11b. Referring to the second position information table T1b, the second positioning means 11b extracts the ID mark position. The decoding means 111 cuts out the image at the specific position in the buffer 104 as notified by the second positioning means lib and decodes it (FIG. 17, Steps S 246–S 247). If the decoding is successful, the document ID is notified to the document image managing means 103 and the image data is cut out and printed (FIG. 17, Steps S 248–S 249).

In the above process, too, the second position information table may be provided with a plurality of possible positions to be checked for an ID mark. In this case, too, those positions may be given priority numbers—"lower left," "upper right," "lower right" and "upper left" for a portrait image, for example. The decoding means 111 tries those positions in that order. And when the ID mark is extracted, the printing step follows.

To summarize, simulation marks are provided within guide frames drawn on the document plate so that the operator may see them and select the position where the ID mark is to be printed on a marked sheet. That is, a bar code can be printed at a position such as a blank space selected by the operator. In the process of reading an ID mark, it is possible to have the ID mark read accurately by placing the ID mark position on the simulation mark position. In another arrangement, an ID mark position is specified by the position keys and the ID mark can be incorporated in a position such as a blank space desired by the operator. In still another configuration, the contents lay is checked. That eliminates the trouble of the operator finding the position to print a bar code at or the position to be read.

To Attain the Third Object:

Embodiment III

Figure 18:
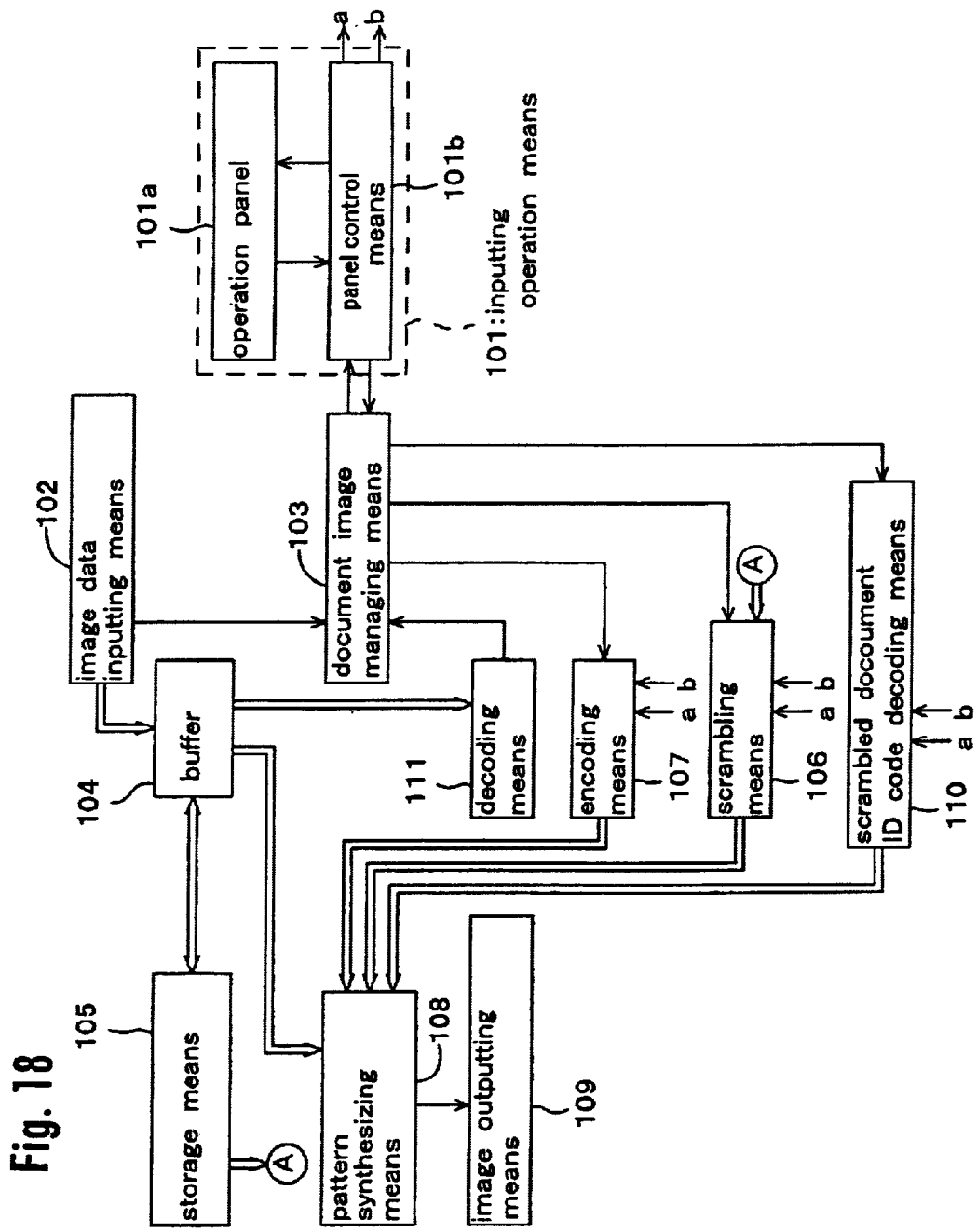
FIG. 18 is a schematic block diagram of the apparatus for image data processing described in Embodiment III.

FIG. 18 is a schematic block diagram showing the configuration of the apparatus for image data processing in another embodiment of the present invention.

As has been described in the preceding embodiments of the present invention, the image data inputted from the image data inputting means 102 is filed in the storage means 105. The corresponding ID is also issued. In parallel with the filing, the original can be copied if so desired by the operator.

Also noted is that a document ID is issued and an ID mark for the document ID is incorporated at a specific position of the marked sheet, which is then outputted from the image outputting means 109 (see FIG. 37).

On top of that, the mark portion on the marked sheet obtained as described above is read by the original copy reading means 102a and converted into a document ID by the decoding means 111. The document ID thus obtained is notified to the document image managing means 103, and the targeted image data is found out. What to do with the image data thus found out is up to the operator. The typical subsequent procedure is to fetch out the image data through the image outputting means 109.

The apparatus for image data processing of the present invention permits copying along with or without filing. In case document filing is not required, ordinary copying is merely done. If this ordinary copying is repeated with the ID mark going through many duplications, the ID mark printed on the original can blur or wear out until it can not longer be read by the decoding means 111. This question is addressed in the following ways:

(Mode (1): reproduction of the ID mark in ordinary copying)

Figure 19:
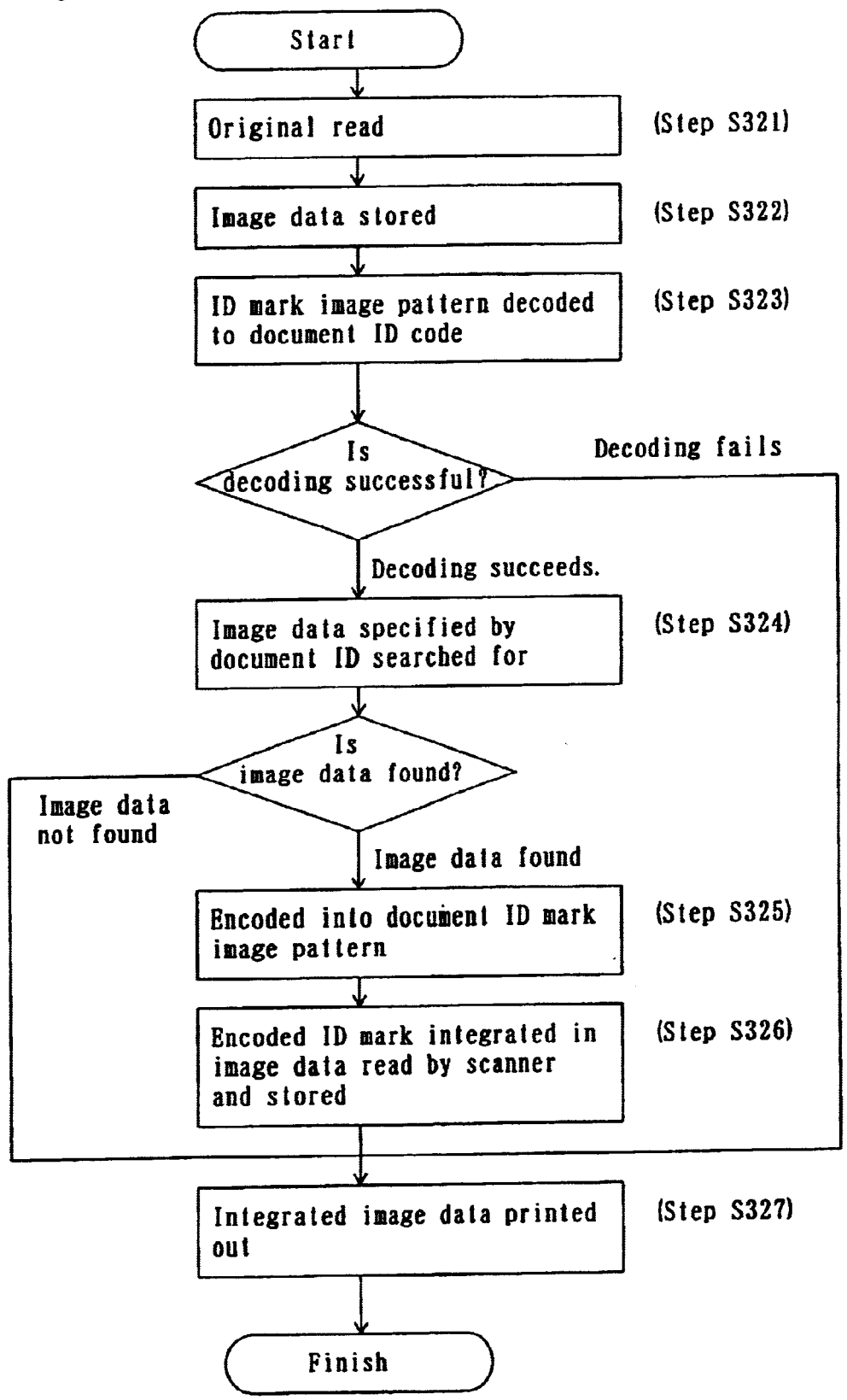
FIG. 19 is a flowchart showing the process of regenerating an ID mark in Embodiment III.

In ordinary copying, the ID mark is reproduced in the present embodiment. FIG. 19 shows a flow chart of that process. The operation will now be explained with reference to FIG. 18 and FIG. 19.

The image on the marked sheet is read by the image date inputting means 102, digitalized and stored in the buffer 104 (Step S 322). The decoding means 111 decodes the ID mark at a specific position of the image data stored in the buffer 104 (Step S 323).

In case the decoding means 111 fails in decoding the ID mark, the image outputting means 109 immediately prints out the image of the stored marked sheet as it is (Step S 327).

If the ID mark can be decoded by the decoding means 111, the document image managing means 103 searches the image data under its control on the basis of the decoded document ID (Step S 324). In case the specific image data is not found (which means that the data is already erased), the image outputting means 109 immediately prints out the ID marked image data, that is, the marked sheet stored in the buffer (Step S 327).

If the specific image data is found in a search by the document image managing means 103 on the basis of the decoded document ID, the document image managing means 103 extracts the position of the ID, mark kept as attribute of that document and notifies the encoding means 107 of that along with the document ID.

Thereby, the encoding means 107 encodes the document ID into an ID mark image pattern (Step S 325). The ID mark thus encoded is inputted in the pattern synthesizing means 108 along with the aforesaid position information. In parallel, the image data is inputted to the pattern synthesizing means 108 from the buffer 104 and there the two are integrated (Step S 326). Finally, the image data thus formed is outputted by printing from the image outputting means 109 (Step S 327).

Thus, the ID mark on the marked sheet is reproduced in copying and the reproduced ID mark is integrated on the copied image in the outputting step.

In the apparatus for image data processing as shown in FIG. 18, document image originals without an ID mark (also with an ID mark impossible to decode or with no corresponding document ID filed in the storage means 105) are merely duplicated. In case a marked sheet is an original, the ID mark encoded on the basis of the document ID of the original can be integrated in the original image for duplication. Thus, the ID mark made on the original is protected from wearing as it goes through duplications. Therefore, there will be no decoding error with even an ID mark on a document image which has passed through many duplications. That facilitates search and fetching out of a filed image data (Mode (2): erasing the ID mark in ordinary copying)

The ID mark may have to be erased as in case the marked sheet will be put in the hands of another or in case it is feared that the marked sheet may be misused. It is also noted that while the document ID, a code, is usually printed under the ID mark at the same time, that enables anyone to fetch out the image data if that code is open to public.

Figure 20:
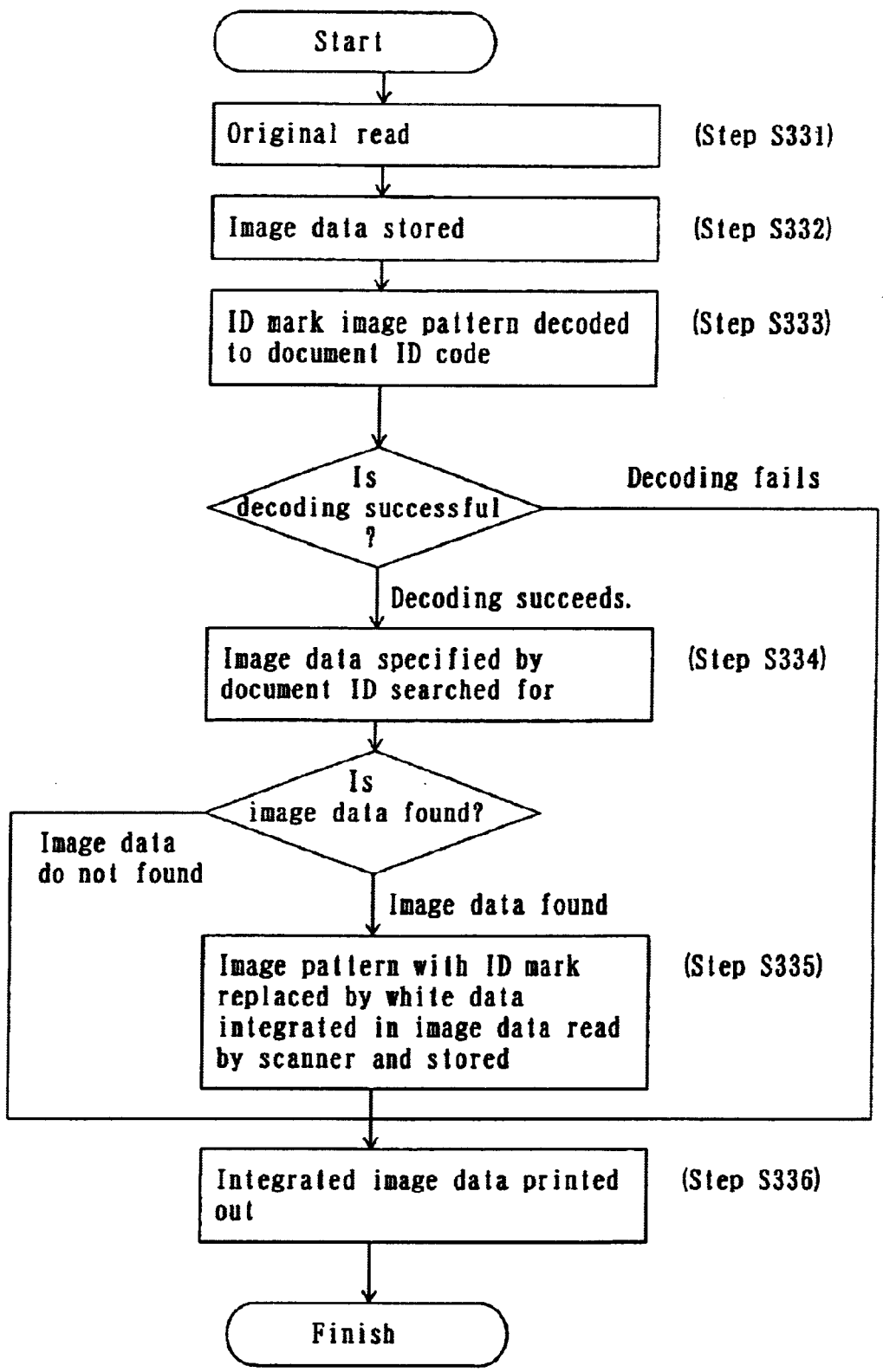
FIG. 20 is a flowchart showing the process of erasing an ID mark in Embodiment III.

FIG. 20 is a flow diagram of the procedure of addressing such a problem.

As in the preceding mode (1), the original image is read by the image data inputting means 102, and the read image data of the original is digitalized and stored in the buffer 104 (Steps S 331–S 332). The ID mark on the read original image is decoded by the decoding means 111 (Step S 333). In case the decoding means 111 finds it impossible to decode the ID mark, the image outputting means 109 immediately prints out the marked sheet stored in the buffer 104. If the ID mark is successfully decoded, the document image managing means 103 searches the kept image data using the decoded document ID (Step S 334).

In case a specific image data is not detected when the document image managing means 103 searches the image data stored in the storage means 105, the image outputting means 109 immediately prints out the marked sheet stored in the buffer 104.

If the document image managing means 103 detects the specific image data by the decoded document ID, the document image managing means 103 notifies a masking means 121 of the position of the ID mark kept as attribute for the image data along with the aforesaid document ID. The masking means 121 then outputs to the pattern synthesizing means 108 a masking data to mask the position of the ID mark. The image data stored in the buffer 104 has also been inputted in the pattern synthesizing means 108 and there the two image data are integrated, forming a document image with the position of the ID mark masked (Step S 335).

After forming such an image data with the position for the ID mark masked, the pattern synthesizing means 108 refers that image data to the image outputting means 109. The image outputting means 109 then outputs or prints out the image data (Step S 336).

Figure 22:
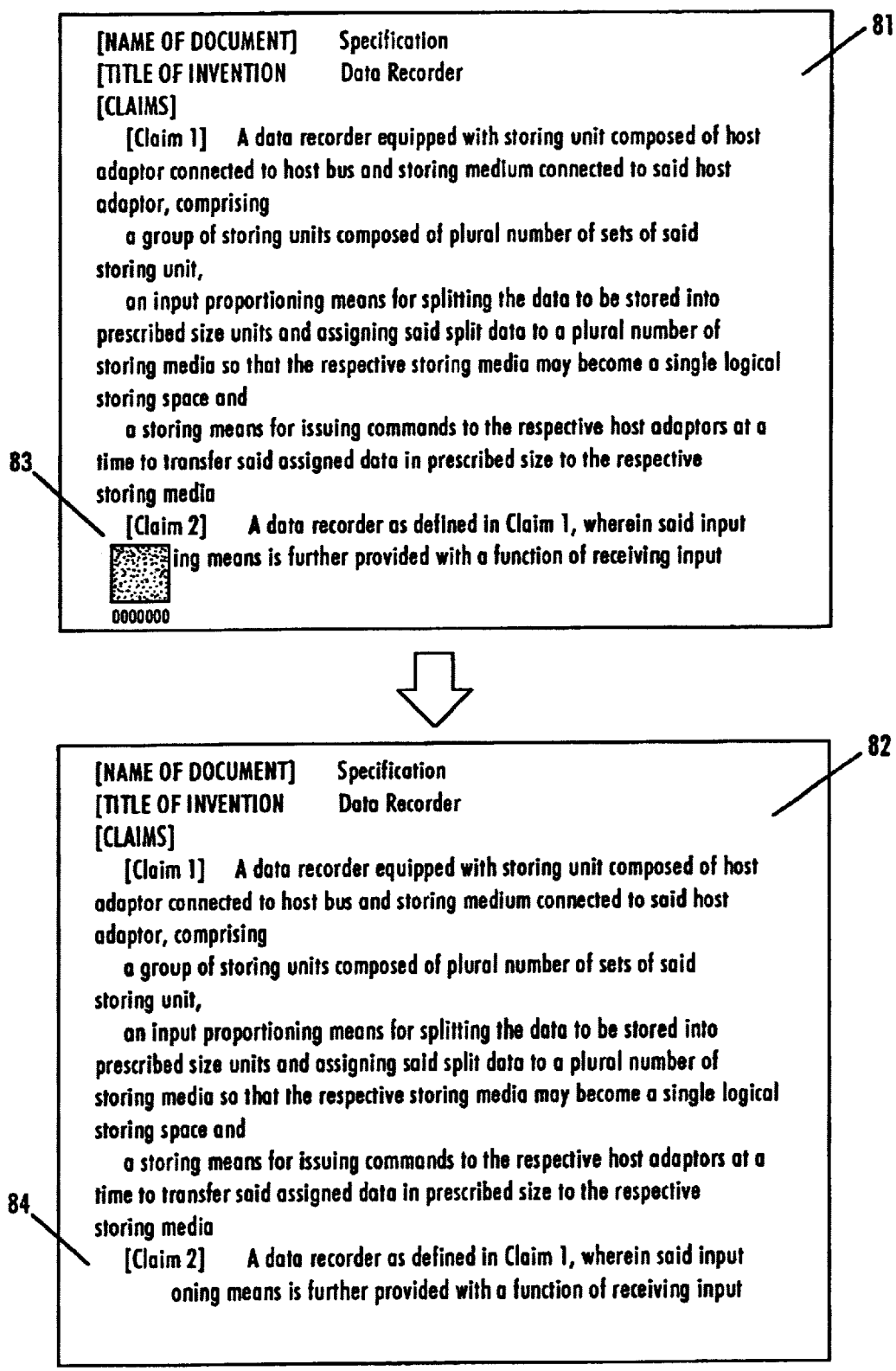
FIG. 22 shows an outputted image example with an ID mark erased in Embodiment III.

An example of such an output with masking is shown in FIG. 22. As shown in FIG. 22, the ID mark 83 on the marked sheet 81 is erased in this apparatus for image data processing. And an image pattern with the ID mark portion replaced with a masked image or a white data is incorporated in an image 82 after duplication.

As described, the original image with no ID mark is merely duplicated, while the original image as marked sheet is copied with the ID mark portion on the original image erased in the apparatus for image data processing as outlined in FIG. 18. That precludes the possibility of the attribute information (document ID) on filed documents falling in the hands of a third party. It is impossible for a third party to draw out the filed image data using a copied original image. This apparatus for image data processing is useful when information other than the document attribute information is to be shared with the third party.

(Mode (3): reproduction of the ID mark portion in ordinary copying)

Figure 21:
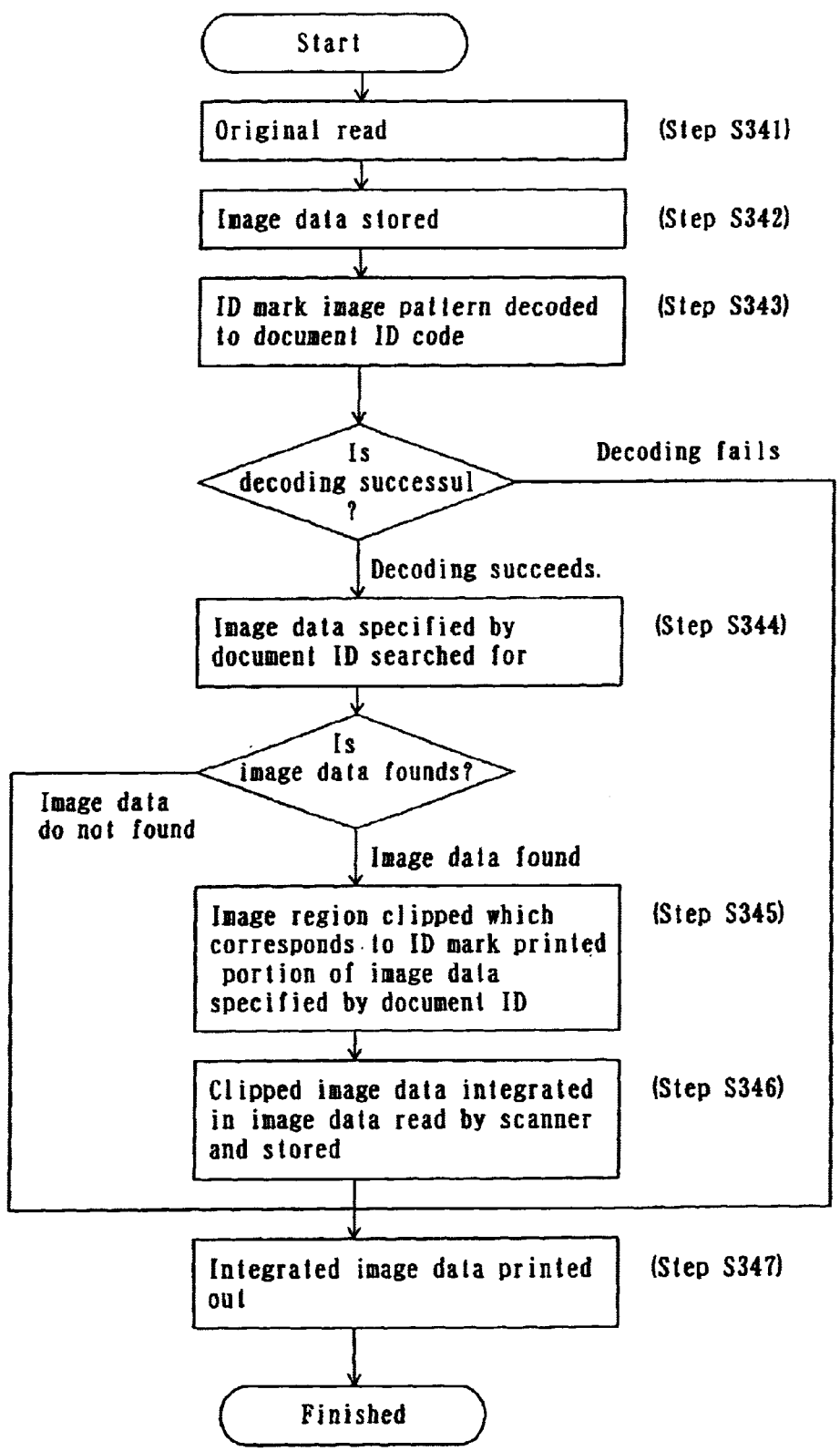
FIG. 21 is a flowchart showing the process of restoring the former image where the ID mark is printed in Embodiment III.

When an ID mark is printed at the position for the ID mark or printing is done with the ID mark erased, the original image (character or letter image) at that portion does not appear. But a copy with the character or letter image missing in part is not good when that page is to be used as full text and not as marked sheet. The process removing that shortcoming is illustrated in FIG. 21.

As in the preceding two embodiments, the original image is read by the image data inputting means 102 and stored in the buffer 104 (Steps S 341–S 342). The image pattern of the ID mark on the original image thus read is decoded into a document ID by the decoding means 111 (Step S 343). In case the decoding of the ID mark fails, the image outputting means 109 immediately prints out the stored marked sheet. If the ID mark is successfully decoded, the image data represented by the document ID which is managed by the document image managing means 103 is searched for with the decoded document ID (Step S 344).

If the image data specified by the document ID thus obtained is not found, the image outputting means 109 immediately prints out the marked sheet stored in the buffer 104 as it is.

In case the targeted image data is found with the document ID, an image clipping means 120 is informed of the position for the ID mark on the corresponding image data from the document image managing means 103. The image clipping means 120 then reads out the image data for that position from the storage means 105 through the buffer 104 and does clipping (Step S 345). The pattern synthesizing means 108 incorporates the image data clipped by the image clipping means 120 in the image data on the marked sheet stored in the buffer 104 and outputs the incorporated image data (Steps S 346–S 347).

Figure 23:
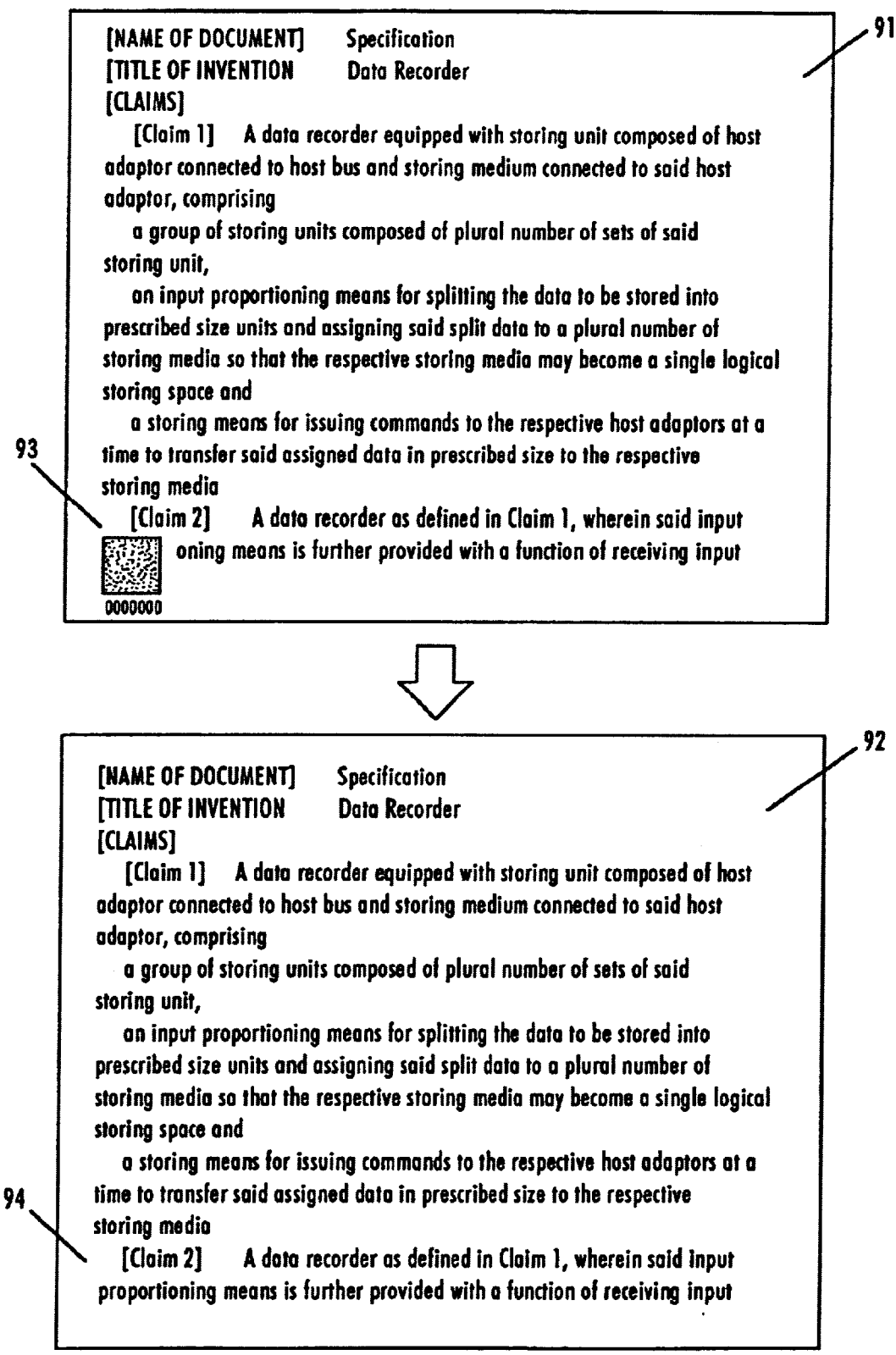
FIG. 23 shows an image example with an ID mark replaced with the image data in the original image in Embodiment III.

The output results of the above-mentioned process are shown in FIG. 23. As shown in FIG. 23, the ID mark 93 on the marked sheet 91 is erased in this apparatus for image data processing. Instead, the image portion 94 corresponding to the ID mark printed area of the document image specified by the filed document ID is incorporated in the image 92 after duplication.

Thereby, even with the marked sheet as original image, the image data hidden under the ID mark can be restored at the position for the ID mark.

(Selection of mode for printing the printing area for the ID mark in usual printing)

In the above description, the operator has to input a necessary instruction through an inputting means such as an operation panel to start up the process of the respective modes (1) to (3).

Figure 24:
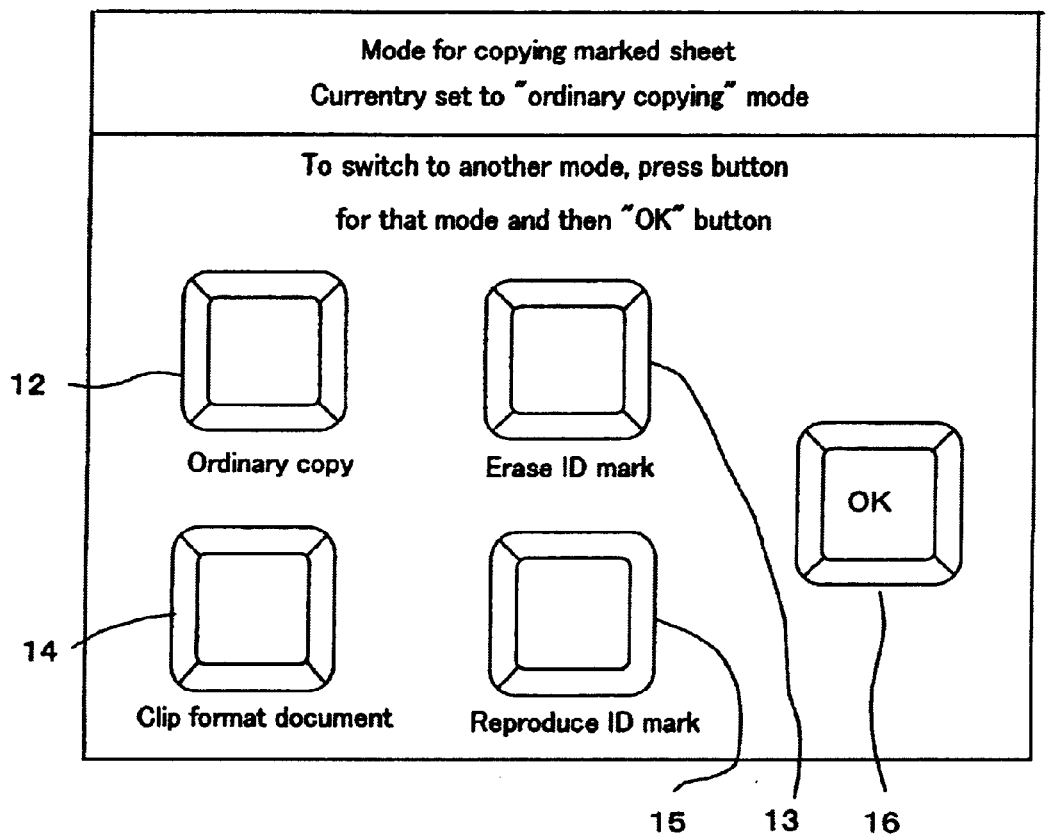
FIG. 24 is a conceptual view of the operation panel in Embodiment III.

FIG. 24 shows the display of the operation panel through which one of those modes can be selected. In this regard, the inputting operation means 101 shown in FIG. 18 includes the operation panel 101a and the panel control means 101b. In the copying mode (the process of entering the copying mode is omitted), four keys are displayed on the operation panel 101a. The four keys are "ordinary copying" key 12, "ID mark erasing" key 19, "original document clipping" key and "ID mark reproducing" key.

If the "ordinary copying" key is pressed, only copying will be effected without any of the aforesaid processes including filing involved therein. The functions of the other keys are: the "original document clipping" key for the mode (3), the "ID mark erasing" key for the mode (2) and the "ID mark reproducing" key for the mode (1). The initial mode of the inputting operation means 101 is the "ordinary copying" mode.

The panel control means 101b controls the masking means 121, the encoding means 107 and the clipping means 120 on the signals from the four keys. In this regard, when the "ordinary copying" key 12 is turned on, the masking means 121, the encoding means 107 and the clipping means 120 all go off and ordinary copying gets ready. If the original document clipping" key 14 is pressed, the masking means 121 and the encoding means 107 go off while the clipping means goes on to start up the mode (3). In this mode, an image data with the former image inserted at the ID mark position is possible to print. If the "ID mark erasing" key is pressed, the masking means 121 goes on while the encoding means 107 and the clipping means 120 go off to start up the mode (2). In this mode, an image data is printed out with the ID mark position left blank If the "ID mark reproducing" key is turned on, the masking means 121 goes off while the encoding means 107 goes on and the clipping means 120 goes off. With that, the mode (1) is started up and a newly encoded ID mark is printed at the ID mark position.

The masking function may be carried out by the encoding means 107. In this regard, the encoding means 107 inputs to the pattern synthesizing means 108 an image with an encoded ID mark made on a white background. In this arrangement, an "ID mark erasing" instruction is issued, the white background only will be outputted. Similarly, the masking function may be entrusted to the clipping means 120. That is, the clipping means 120 clips an image at a specific position on a specific document image stored in the storage means which is nothing other than a white pattern, and when an "ID mark erasing" order is issued, the white pattern will be clipped for a masked image.

Under the aforesaid arrangements, the operator can freely select one of the above-mentioned three modes.

As set forth above, it is so configured in the present invention that each time a marked sheet is duplicated, the ID mark is renewed. Therefore, there will be no blurring or wearing of the ID mark on the mark sheet even after the mark has passed through duplications. Another feature is that a masking function is provided. When the ID mark or marked sheet should not be handed over to a third party, the printing can be effected with the ID mark or the document ID masked. Still another feature is the text reproducing function. When the image formerly present at the masked document ID position needs to be restored, that part is read out from the storage means and added to the original, and a complete image data can be obtained.

To Attain the Fourth Object:

Embodiment IV-1

Figure 25:
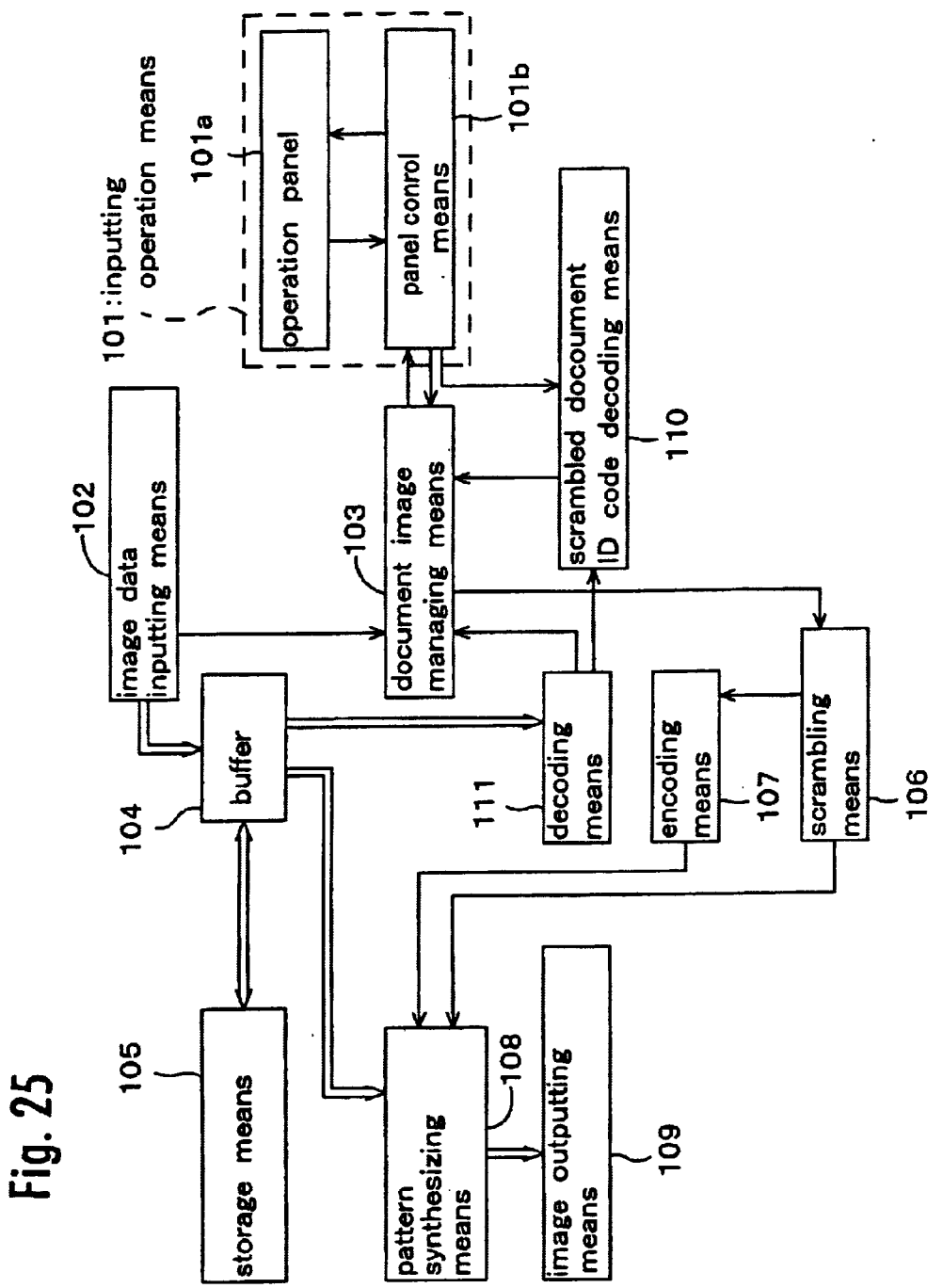
FIG. 25 is a functional block diagram showing the configuration of the apparatus for image data processing in Embodiment IV-1.
Figure 26:
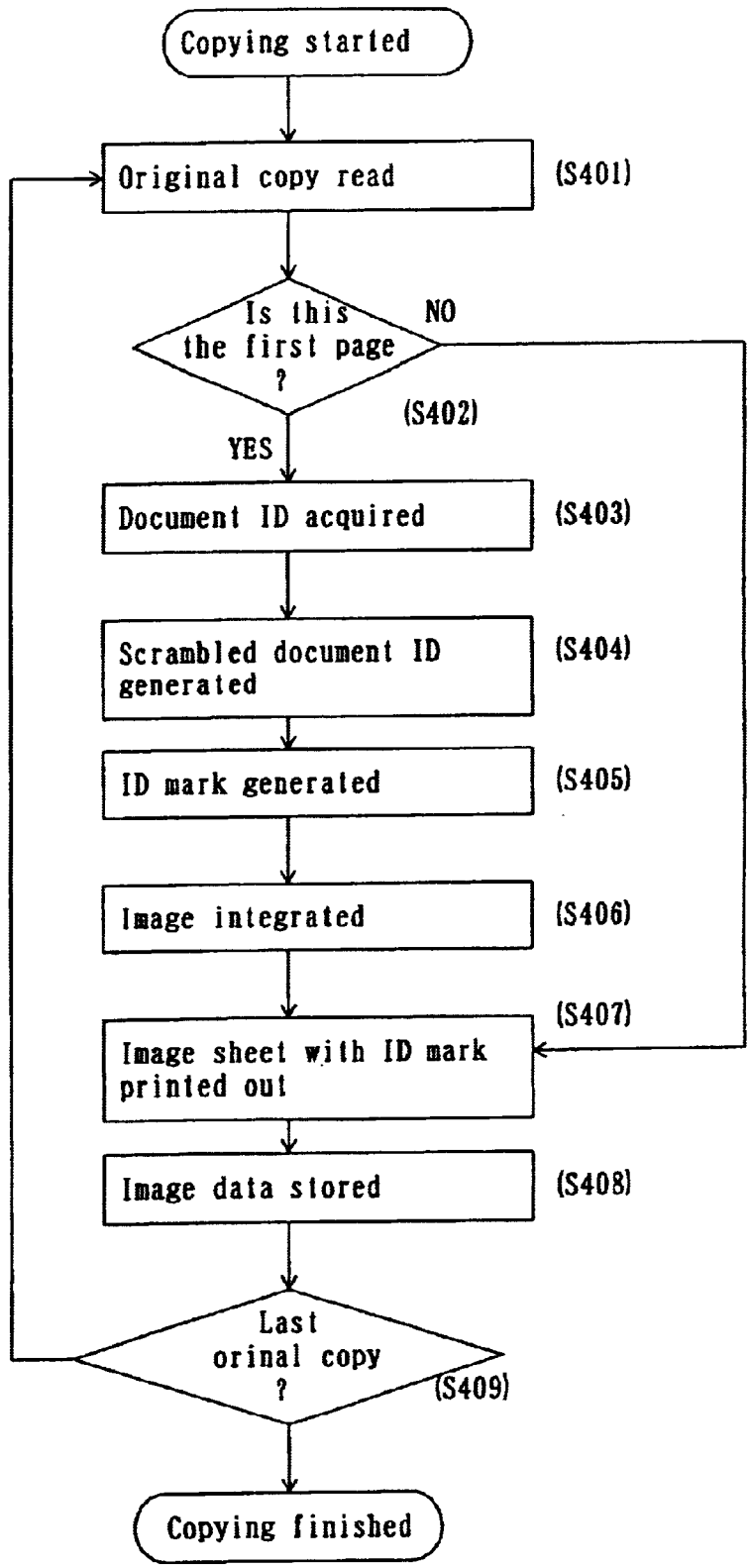
FIG. 26 is a flow diagram showing the procedure of filing an image data in Embodiment IV-1.

FIG. 25 is a functional block diagram showing the configuration of Embodiment IV-1 of the apparatus for image data processing of the present invention. The configuration and operation of this embodiment will be hereinafter explained taking an example of filing an image data and duplicating the original copy in the apparatus for image data processing of the present invention with reference to FIG. 25 and FIG. 26. FIG. 26 is a flowchart showing the process which is followed in the present embodiment.

The present embodiment is identical with the preceding embodiments in the process up to the step of the document image managing means 103 generating the document ID. The description up to that part will not be repeated (FIG. 26, Steps S 401–S 403). It is understood that document ID's, which are given to image data in filing, are numbered sequentially. Also noted is that the document ID is for specifying an image data and may be generated on the basis of the filing time, for example.

The document ID generated by the document image managing means 103 is notified to a scrambling means 106. The scrambling means 106 converts the inputted document ID into a scrambled document ID which corresponds to the inputted document ID one to one but is not one of logically serial numbers (Step S 404).

It is noted that in the present embodiment, "exclusive OR" is used as method of converting a document ID into a scrambled document ID. This "exclusive OR" will involve a bit operation of a binary digit string as base numeral with the object numeral to be converted. The base numeral used for scrambling is the same as that for nonscrambled coding.

In case of three consecutive filings of image data, for example, the numbers "0000001," "0000002" and "000003" are given to those data as document ID in order of filing. In this case, the following numerals as scrambled document ID can be obtained by the exclusive OR of the aforesaid document ID and a base numeral or a specific value, for example, a 16 sexadecimal notation 0×FFFFFA: "0000004," "0000007" and "0000006."

The scrambling means 106 notifies the scrambled document ID thus converted to the encoding means 107 as a code for the ID mark and to the pattern synthesizing means 108 as a code for display. This code for display is a letter or digit string actually shown on the marked sheet.

The code for the ID mark notified, the encoding means 107 encodes to an ID mark such as a two-dimensional bar coded image pattern. The ID mark is stored on a bit map memory of the pattern synthesizing means 108 (Step S 405).

The pattern synthesizing means 108 then integrates the ID mark stored on the bit map memory, the image data kept in the buffer 104 and the display code notified from the scrambling means 106 to produce an image data corresponding to the marked sheet (Step S 406). This integrated ID marked image is printed on printing paper as marked sheet using toner, ink or the like by the image outputting means 109 such as a electrophotographic type printer in the form that the image data, the ID mark M and the display code C are integrated at a specific position as shown in FIG. 27 (step S 407).

Thus, as shown in FIG. 27, the display codes C1–C3 and the ID marks M1–M3 based on the scrambled document ID are printed on the marked sheets in the example where three image data are filed consecutively.

Then the image data stored in the buffer 104 is given a file name based on the document ID received from the document image managing means 103 and filed in the storage means 105 such as a hard disk (Step S 408).

If the original has two or more pages, the image data inputting means 102 reads the next page of the original, digitally converts and stores it in the buffer 104 as image data (Step S 409–S 401). The image data from the second page on is printed as it is by the image outputting means 109 and filed in the storage means 105 (Steps S 402–S 407–S 408). These steps are repeated until the end of the original, when filing and copying come to a close.

The above description of the present embodiment has taken an example where the image data is filed along with the copying of the original. The present invention is not limited thereto. The filing of the image data may also be effected alone or together with facsimile transmission of the image data, the printing of the image data from a personal computer or alone without any other steps. Which course to take can be specified through the inputting operation means 101 by the operator.

Figure 29:
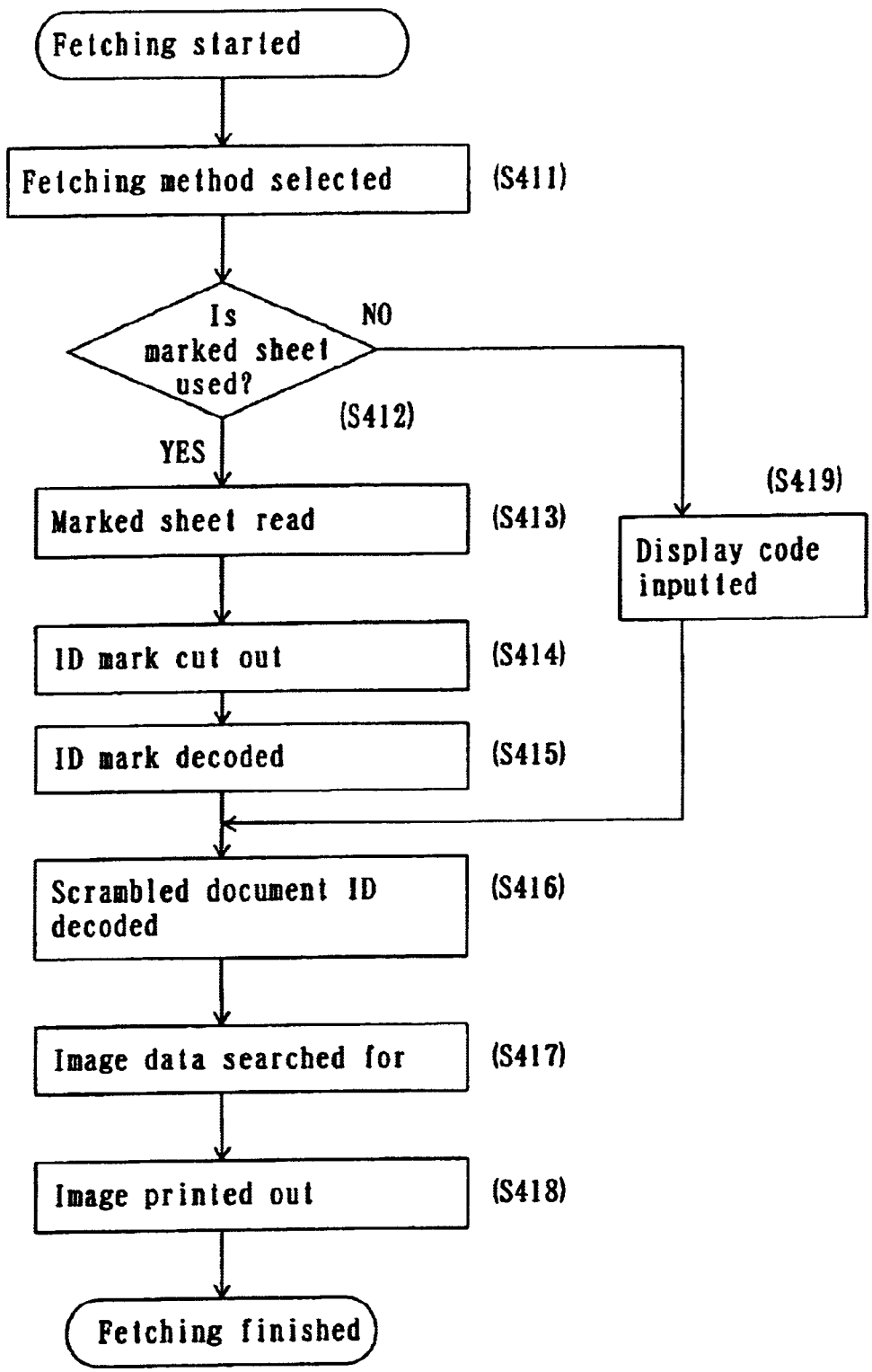
FIG. 29 is a flow diagram showing the procedure of fetching out an image data in Embodiment IV-1.
Figure 30:
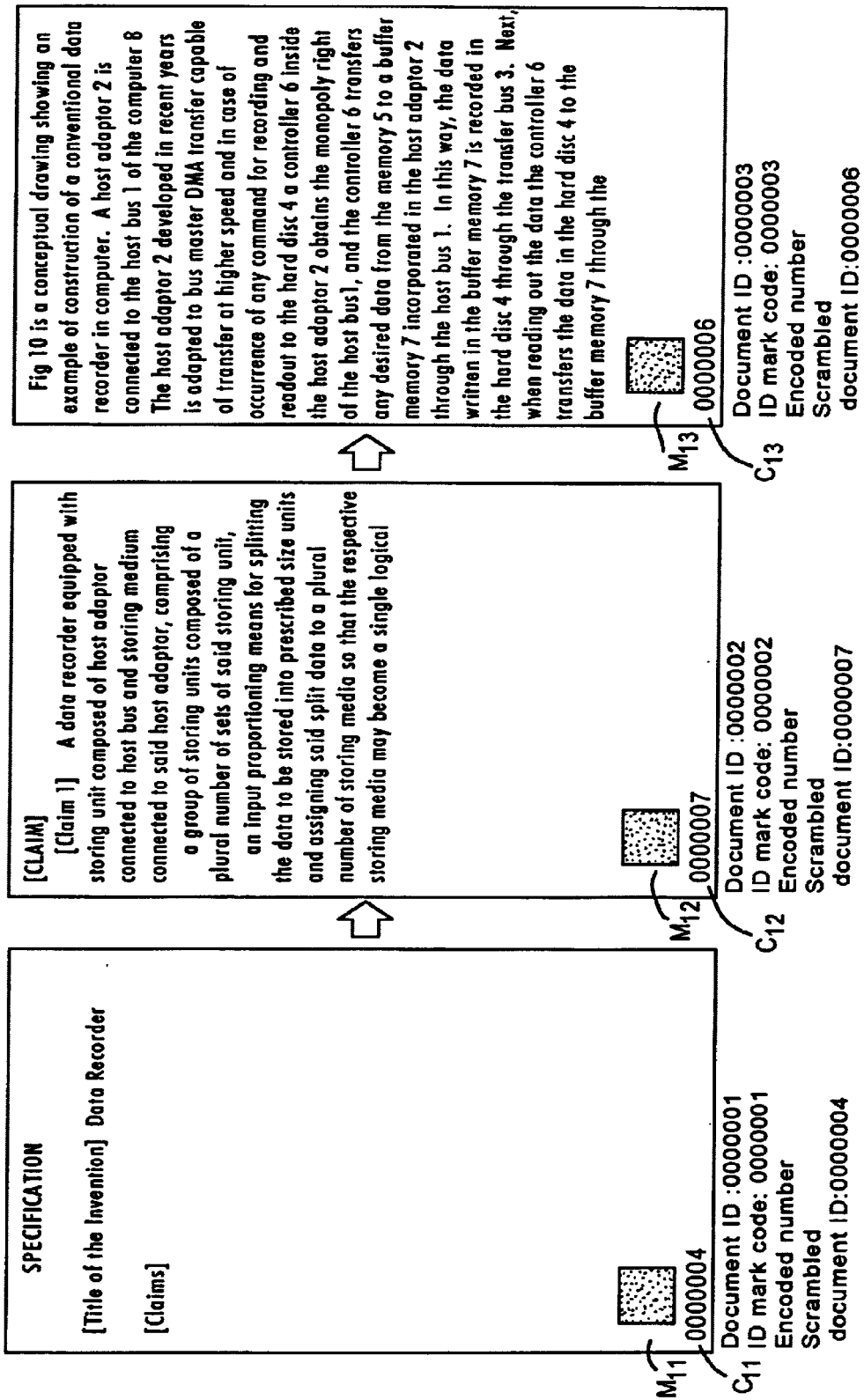
FIG. 30 shows examples of three marked sheets with image data filed continuously in Embodiment IV-1.

There will now be explained the process of fetching out the image data filed in the storage means 105. FIG. 29 is a flow chart showing illustrating that process.

The image data are possible to fetch out in two ways. Which way to take is selected on an operation panel 101a as shown FIG. 28. One way involves specifying the image data by instructing that the marked sheet be read. In the other, the display code printed as a digit string under the ID mark is directly input by key.

The operator first selects the way to fetch out the document on the operation panel 101a (FIG. 29, Step S 411).

To specify by the marked sheet, the operator presses the "marked sheet" frame shown in FIG. 28 to select and put the marked sheet on the image data inputting means 102. This instruction information is kept by the panel control means 101b of the inputting operation means 101. When the start button is pressed on the operation panel 101a, the panel control means 101b instructs the image data inputting means 102 to read the marked sheet.

Receiving the instruction, the image data inputting means 102 reads, digitalizes and stores the marked sheet in the buffer 104 (Steps S 412–S 413). The decoding means 111 then cuts out the image data at the position of the ID mark from the image data stored in the buffer 104 (Step S 414), decodes that ID mark, acquires the ID mark on the marked sheet and notifies that to the scrambled document ID decoding means 110 (Step S 415).

The scrambled document ID decoding means 110 converts the received ID mark code, that is, the aforesaid scrambled document ID into the above-mentioned document ID corresponding to the scrambled document ID and notifies that to the document image managing means 103 (Step S 416). The conversion of the inputted scrambled document ID into the above-mentioned document ID is performed by exclusive OR with 0×FFFFFA (sexadecimal notation) as base numeral.

The document image managing means 103 instructs that the image data corresponding to the document ID be read (Step S 417). Under this instruction, the image data is read out to the buffer 104 from the storage means 105. Further, the read image data is outputted from the image outputting means 109 (Step S 418).

Meanwhile, to specify an image data by inputting the display code directly, the operator presses the frame Fd for "inputting the display code" and inputs the display code. This instruction information is kept by the panel control means 101b of the inputting operation means 101, and when the start button on the operation panel 101a is pressed, the panel control means 101b notifies the inputted display code, that is, the scrambled document ID to the scrambled document ID decoding means 110 (Step S 419).

The scrambled document ID decoding means 110 converts the received scrambled document ID into the aforesaid document ID corresponding to the scrambled document ID in the same manner as in specifying the image data by the marked sheet, and conveys that to the document image managing means 103 (Step S 416). The subsequent process is carried out in the same way as in specifying the image data by the marked sheet, and the image data represented by the document ID is outputted from the image outputting means 109 (Steps S 417–S 418).

The present embodiment is so configured that the scrambling means 106 notifies the scrambled document ID to the encoding means 107 as an ID mark code and to the pattern synthesizing means 108 as the aforesaid display code. Instead, it may be so arranged that the scrambling means 106 notifies the unscrambled document ID to the encoding means 107 as the ID mark code and the scrambled document ID to the pattern synthesizing means 108 as the display code.

In this configuration, the display codes C11 to C13 based on the scrambled document ID and the aforesaid ID marks M11 to M13 based on the document ID are printed on the marked sheets in the example where three image data are filed consecutively.

As set forth above, the scrambled document ID's are used in the display codes on the marked sheets, and therefore there is no fear that the filing order can be detected by merely reading the display code even if the image data are filed consecutively. That precludes the possibility of guessing display code on a marked sheet from another display code and fetching out the object image data wrongfully.

Besides, the ID mark, too, is encoded on the scrambled document ID. Even if the ID mark is decoded, the display code for another image data can not be detected and it is impossible to fetch out the image data wrongfully.

Embodiment IV-2

In the preceding embodiment VI-1, the configuration is such that it is predetermined which to use, the document ID or the scrambled document ID as the display code and the ID mark code. In the present embodiment, it is so configured that the operator can choose which to use.

Figure 31:
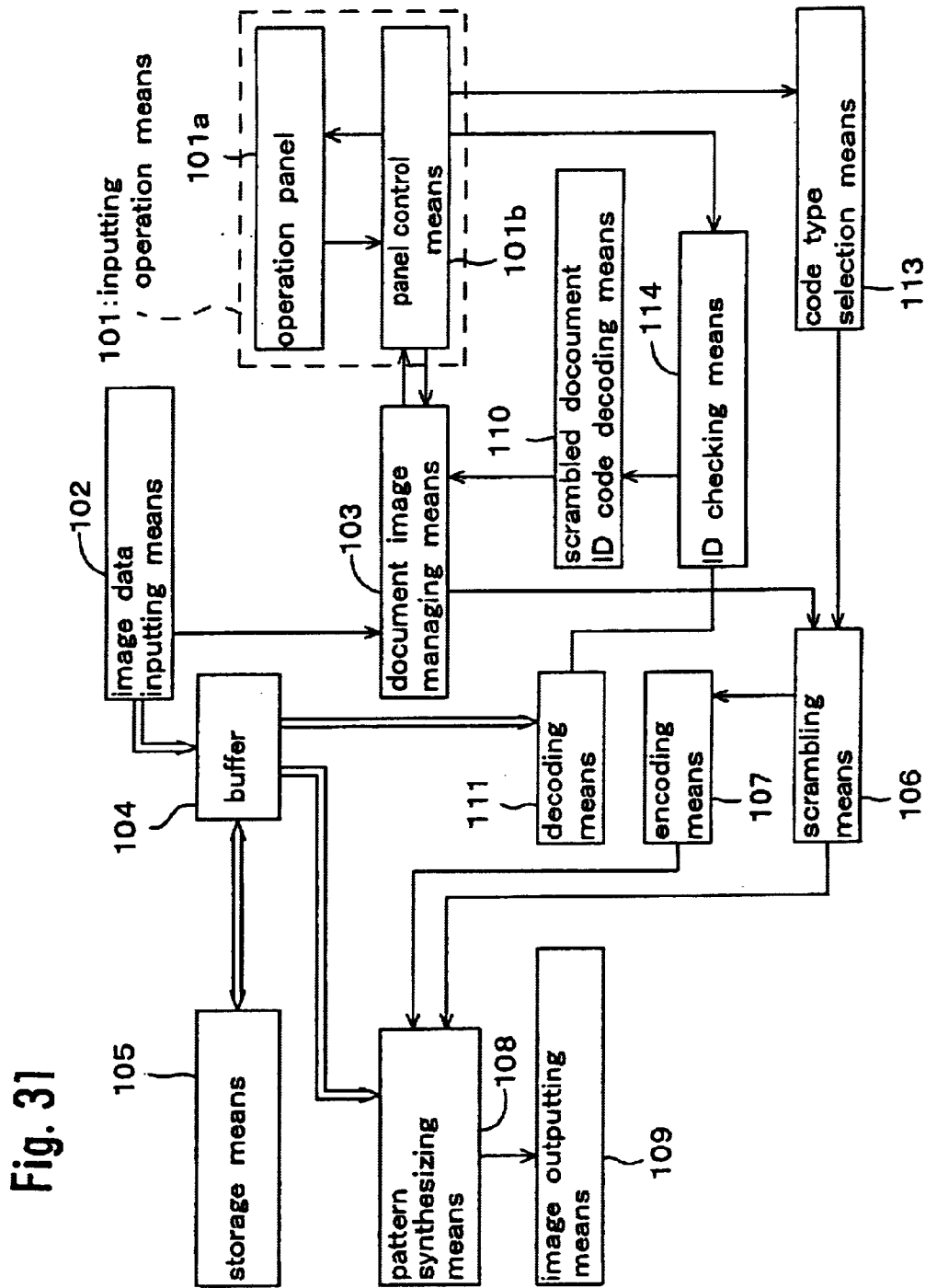
FIG. 31 is a functional block diagram showing the configuration of the apparatus for image data processing in Embodiment IV-2.
Figure 32:
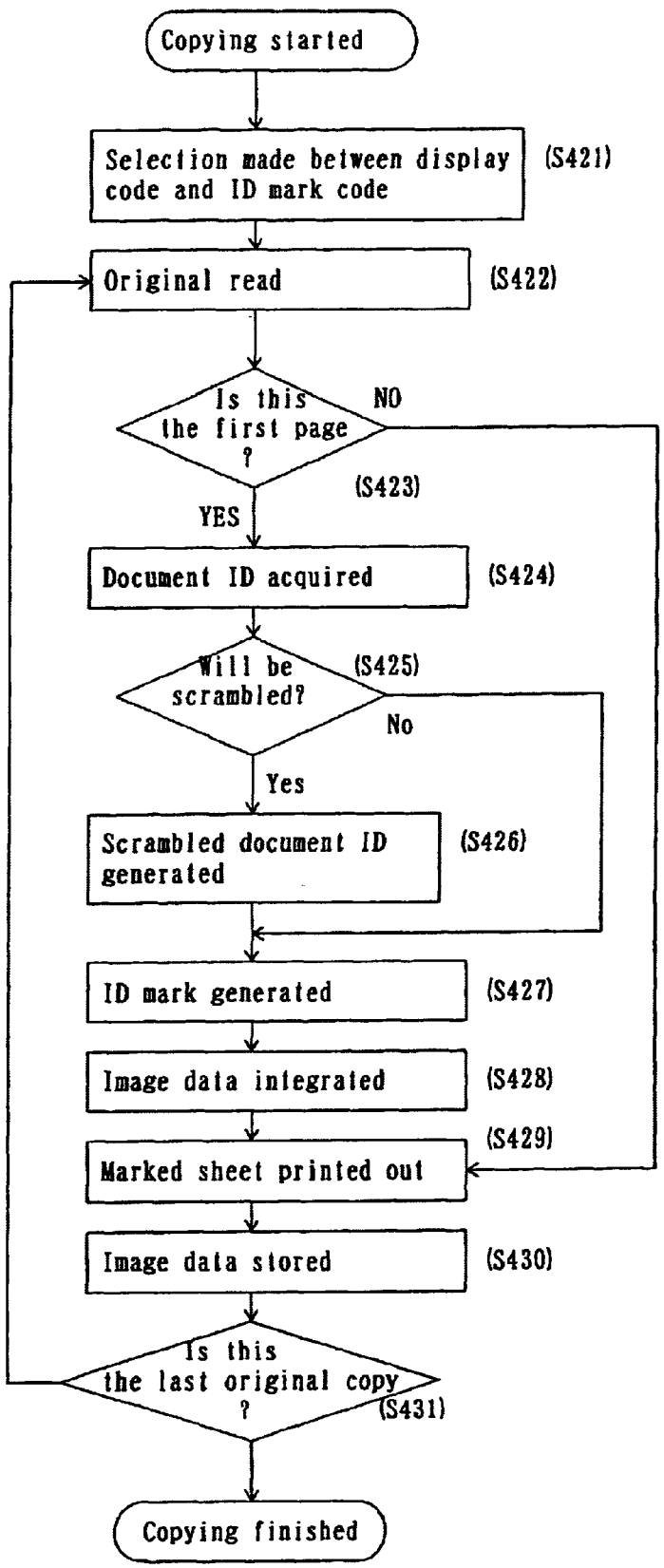
FIG. 32 is a flow diagram showing the procedure of filing an image data in Embodiment IV-2.

FIG. 31 is a functional block diagram showing the configuration of the present embodiment of the apparatus for image data processing according to the present invention. There will now be described the configuration and process of the present embodiment taking an example of filing the image data along with copying the original in the apparatus for image data processing. FIG. 32 is a flow chart showing the process in the present embodiment. It is noted that the arrangements identical with those in the previous embodiment will not be explained but common reference numerals are used in the identical arrangements.

Figure 33:
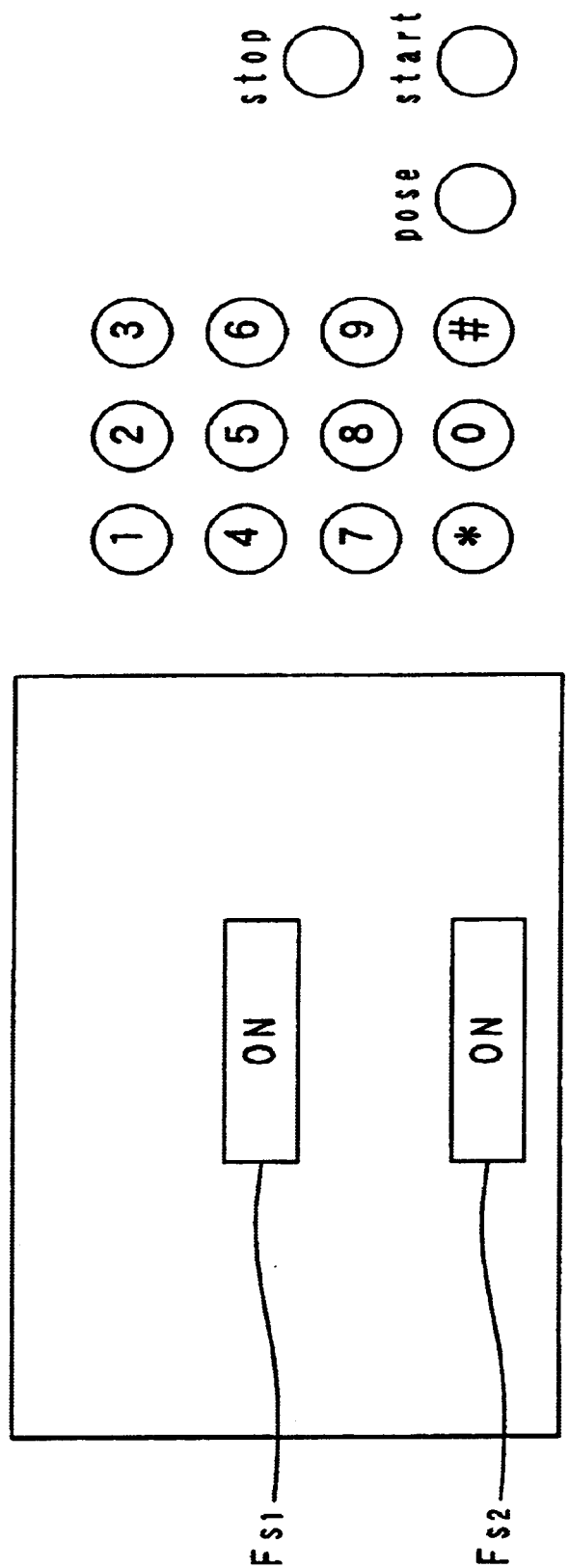
FIG. 33 is a view of an operation panel on which the code for display and the code for the ID mark are selected.

The operator first selects instructions for copying and filing of image data on the operation panel 101a of the inputting operation means 101. Then the code type selection means 113 is activated and there appear on the operation panel 101a code selection frames as shown in FIG. 33 where the operator selects which to use, the document ID or the scrambled document ID for the marked sheet display code and the ID mark code. If the scrambled document ID is to be to used for both display code and ID mark code, for example, the operator selects "ON" on both selection frames Fs1 and Fs2. In case the document ID is to be used for both, "OFF" is selected on both frames (FIG. 33, Step S 421).

The instruction information is kept by the panel control means 101b of the inputting operation means 101, and when the start button is pressed, the panel control means 101b instructs the image data inputting means 102 to read the original and the document image managing means 103 to file the image data. Further, the panel control means 101b informs the code type selection means 113 which, "ON" or "OFF," is selected for the display code and the ID mark code.

Receiving the instructions, the image data inputting means 102 reads, digitally converts and stores the image data in the buffer 104 (Step S 422).

At the same time, instructed to file the image data, the document image managing means 103 generates a document ID, say a 7-digit number, representing the image data to be filed (Steps S 423–S 424) and informs the scrambling means 106 of that. The document ID is one of consecutive numbers; files are numbered sequentially.

The code type selection means 113 instructs the scrambling means 106 to output a display code on the basis of the scrambled document ID, if the operator selects "ON" on the display code selection frame, and to output the display code on the basis of the document ID if the operator selects "OFF." Furthermore, the code type selection means 113 instructs the scrambling means 106 to output the ID mark code on the basis of the scrambled document ID, if the operator selects "ON" on the ID mark code selection frame, and to output the ID mark code on the basis of the document ID if the operator selects "OFF."

The scrambling means 106 converts the document ID inputted as in Embodiment IV-1 into a scrambled document ID which corresponds to the inputted document ID one to one but is not one of logically sequential numbers when the scrambled document ID is required (Steps S 425–S 426).

In addition, the scrambling means 106 notifies the scrambled document ID or document ID converted as above on the instruction of the code type selection means 113 to the encoding means 107 as ID mark code and to the pattern synthesizing means 108 as display code.

Here, the ID mark code and the display code are enlarged from a 7-digit number to a 8-digit number with the eighth digit for a "scramble flag column." The "scramble flag column" is an indicator for the document ID or the scrambled document ID and set to "1" for the scrambled document ID and "0" for the document ID.

If, for example, the scrambled document ID is selected, the ID mark code and the display code which correspond to "0000001" are "1-00000004." In case the document ID is selected, the ID mark code and the display code which correspond to "0000002" are "0-00000002."

Notified of the ID mark code, the encoding means 107 encodes it into an ID mark. The encoded ID mark is stored on the bit map memory of the pattern synthesizing means 108 (Step S 427). Then, the pattern synthesizing means 108 integrates the ID mark stored on the bit map memory, the image data kept in the buffer 104 and the display code notified from the scrambling means 106 onto an image corresponding to the marked sheet (Step S 428). This integrated image with the ID mark is printed by the image outputting means 109 as marked sheet with the image data, the ID mark and the display code incorporated at a specific position (Step S 429).

The image data stored in the buffer 104 is then given a file name based on the document ID received from the document image managing means, and is filed in the storage means 105 (Step S 430).

The subsequent steps for an original consisting of two or more pages are the same as those in Embodiment IV-1 (Steps S 431–S 422–S 423–S 429–S 430).

There will now be described the following example: As in Embodiment IV-1, three image data are filed consecutively. In the first filing of image data, the scrambled document ID is selected as the display code and the ID mark code. In the second filing and third filing of image data, the document ID is selected as the display code and the ID mark code. In this case, the first marked sheet is printed with the ID mark M21 and the display code C21 based on the scrambled document ID as shown in FIG. 34(a). Also, as shown in FIG. 34(b) and (c), the second and third marked sheets are printed with the ID marks M22, M23 and the display codes C22, C23 based on the document ID.

As described above, the display code on the first marked sheet and that on the second marked sheet are not logically consecutive, while the display code on the second marked sheet and that on the third marked sheet, not scrambled, are logically consecutive.

Figure 35:
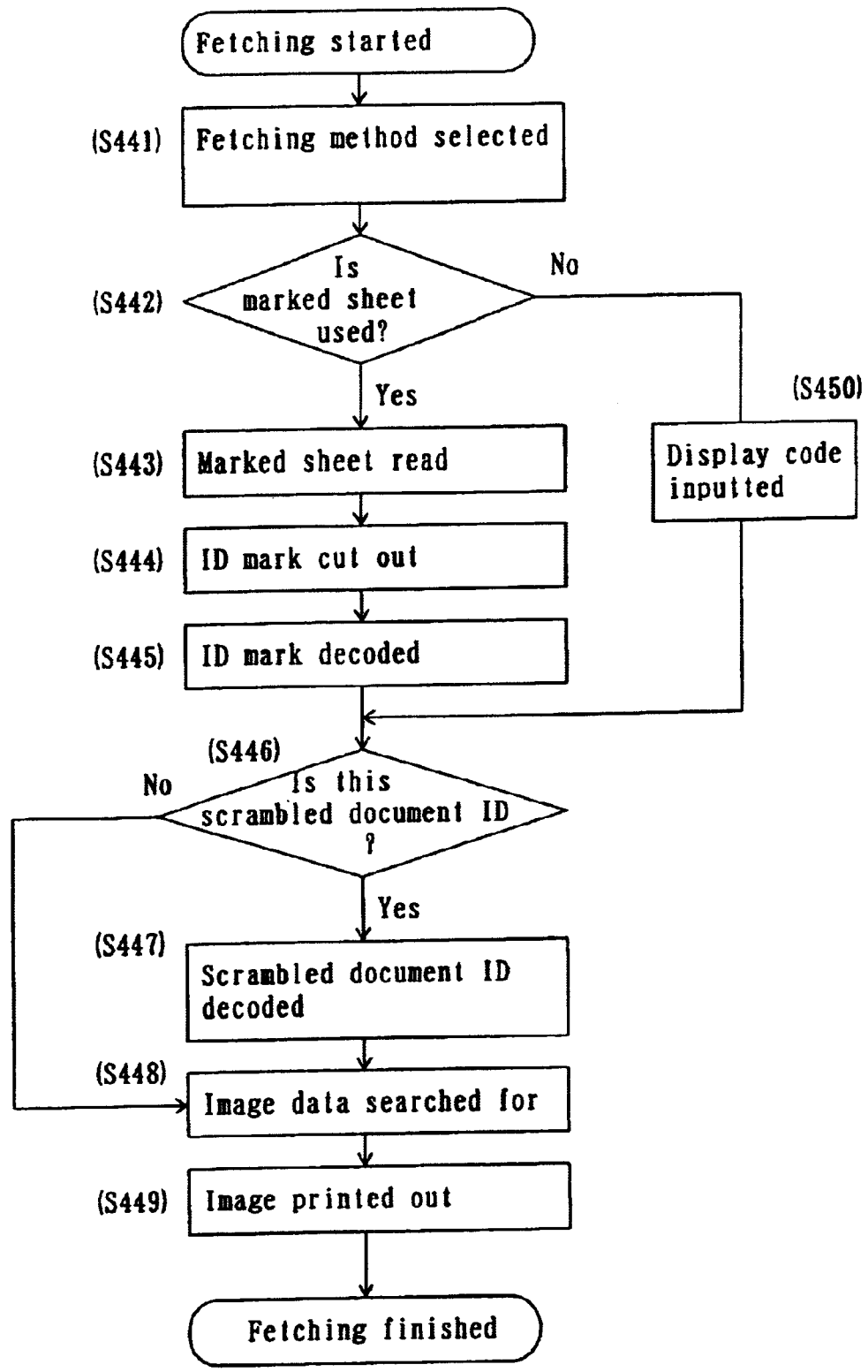
FIG. 35 is a flow diagram showing the procedure of fetching out an image data in Embodiment IV-2.

In the following the process of fetching out the image data filed in the storage means 105 will be explained. FIG. 35 is a flow chart showing that process.

The image data are possible to fetch out in two ways as in Embodiment IV-1. One way involves specifying the image data by instructing that the marked sheet be read. In the other way, the display code printed as a digit string under the ID mark is directly input by key.

First, in the way involving specifying the image data by the marked sheet, the present embodiment and the previous embodiment are identical in the steps of the decoding means 111 cutting out the image data at the position of the ID mark from the image data stored in the buffer 104 and decoding the ID mark to acquire the ID mark code on the marked sheet (FIG. 35, Steps S 441–S 445). In the following, the subsequent steps will be described.

The ID mark code acquired by the decoding means 111 is referred to the ID checking means 114.

The ID checking means 114 finds out which ID the notified ID mark code is, a document ID or a scrambled document ID. That can be known by the "scramble flag column" contained in the ID mark code (Step S 446). That is, if the "scramble flag column" is "1," the code is a scrambled document ID. If the "scramble flag column" is "0," the code is a document ID. If the code is found to be a scrambled document ID, this scrambled document ID is notified to the scrambled document ID decoding means 110. If it is judged that the code is a document ID, this document ID is notified to the document image managing means 103.

The scrambled document ID decoding means 110 converts the received ID mark code, that is, the scrambled document ID into the corresponding document ID and notifies that to the document image managing means 103 (Step S 447). The conversion of the inputted scrambled document ID into the above-mentioned document ID is performed by exclusive OR with 0×FFFFFA (sexadecimal notation) as base numeral.

Thus, the document ID is notified to the document image managing means 103, whether the ID mark code is a document ID or a scrambled document ID.

In the next step, the document image managing means 103 instructs that the image data corresponding to the document ID be read (Step S 448). On the instructions, the image data is read from the storage means 108 onto the buffer 104. The image data thus read out is then printed out by the image outputting means 109 (Step S 449).

In the way involving specifying the image data by directly inputting the display code, the operator presses the frame Fd for "inputting the display code" and inputs the display code. This instruction information is kept by the panel control means 101b of the inputting operation means 101, and when the start button on the operation panel 101a is pressed, the panel control means 101b notifies the inputted display code to the ID checking means 114 (Step S 450).

The subsequent process is carried out the same way as in specifying the image data by the marked sheet. The image data corresponding to the document ID is outputted from the image outputting means 109 (Steps S 446–S 449).

In the above description, it is so arranged that the display code and the ID mark code can both be selected through the code type selection means 113. It may be so configured that either of the two can be selected. In an arrangement where the document ID is used as ID mark code and the display code can be selected from the code type selection means 113, for example, the scrambling means 106 notifies the encoding means 107 of the document ID as ID mark code. And according to the instructions from the code type selection means 113, the scrambled document ID or the document ID as display code is notified to the pattern synthesizing means 108.

That arrangement will be described using the following example where, as in the previous example, three image data are filed consecutively. And when the first image data is filed, the scrambled document ID is selected as the display code. In filing the second and third image data, the document ID is selected as the display code. In such an example, the marked sheets are printed with the ID marks M31 to M33 based on the document ID respectively. As to the display code, the first marked sheet is printed with the display code C31 based on the scrambled ID (FIG. 36(a)) and the second and third marked sheets are printed with the display codes C32, C33 based on the document ID (FIG. 36(b), (c)).

As described above, it is so arranged that the operator can choose which to use for the display code on the marked sheet, the scrambled document ID or the document ID. That is, the operator can decide in which mode to file the image data, in the high confidentiality mode or in the low confidentiality mode. Furthermore, if it is so configured that on which basis the ID mark is to be encoded, on the basis of the scrambled document ID or the document ID can also be selected, then four degrees of confidentiality will be available and the operator can choose one among them according to the required confidentiality.

When the display code is directly inputted to specify the image data, too, the same and unified procedure is followed, whether the display code is based on the document ID or the scrambled document ID.

It is noted that in any of the preceding embodiments, numerals are used as the document ID. Letters or characters may be contained in the string as long as they are logically sequential.

Also, in those embodiments, a two-dimensional bar code is used. The bar code is not limited thereto but may also be a general one-dimensional bar code.

It is also noted that those embodiments use "exclusive OR" in encoding and decoding the scrambled document ID. Instead, "bit shift," "bit rearrangement," "bit combination" or the like may be used.

In the preceding embodiments of the apparatus for image data processing of the present invention, as set forth above, the display code used on the marked sheet can be formed of a scrambled document ID which corresponds to the inputted document ID one to one but is not logically sequential to other ID's, and not the document ID, that is, not a file management information within the system. Therefore, it is difficult to guess such a code for an image data from display codes on the marked sheets for other image data filed before or after that. Thus, the confidentiality can be raised and the image data can be protected from wrong hands.

Furthermore, the encoding of the ID mark on the basis of the scrambled document ID makes it difficult to guess the display code for an image data even if the ID mark can be decoded. Thus, the confidentiality can be further increased to preclude the possibility of the image data being taken out wrongfully. It is also noted that even with adoption of a generally known standard method of encoding and decoding the ID mark, the image data can be protected against falling into wrong hands.

Another feature is that the operator can choose which to use for the display code on the marked sheet, the scrambled document ID or the document ID, and also on which basis the ID mark is encoded, on the basis of the scrambled document ID or the document ID. Thus, four confidentiality modes are available for filing image data, and a choice can be made depending on the degree of confidentiality required.

What is claimed is:

1. An apparatus for image data processing wherein image data relating to an identifier (ID) mark is stored in a storage means and wherein a sheet with the ID mark and said image data is printed out, said apparatus comprising:

a detection means for finding the sheet size, a first position information table with a writing position for the ID mark given for each sheet size, a first position means for deciding on the position to write in the ID mark that refers to document ID mark when said document ID mark is integrated in said image data and an image pattern synthesizing means for synthesizing said document ID mark at the position decided on by said second positioning means, therein preparing an image data representing said marked sheet.

2. The apparatus for image data processing as defined in claim 1, wherein said first positioning means provides a plurality of positions as possible positions to write the ID mark, giving priority numbers to said plurality of possible positions and checking the availability of said possible positions according to the order of said priority numbers.

3. The apparatus for image data processing as defined in claim 2, further comprising a space checking means for checking to see if said ID mark writing position is blank or not and notifying the results to said first positioning means.

4. An apparatus for image data processing wherein image data is given a document ID to specify said image data and then filed in a storage means and wherein said image is read out from said storage means by specifying said document ID, said apparatus comprising:

a sheet size detection means for finding the sheet size of the image data, a first position information table with a writing position to read out the ID mark for each sheet size, a first positioning means for deciding on the position to read out the ID mark that refers to said first position information table on the sheet size found by said sheet size detection means, an input control means that instructs an image data inputting means to input a corresponding image data at the ID mark reading position determined by said first positioning means, and a decoding means for decoding the image data and acquiring said document ID.

5. The apparatus for image data processing as defined in claim 4, wherein said first positioning means provides a plurality of positions on the paper as possible positions to write in the ID mark, giving priority numbers to said plurality of possible positions and checking the availability of said possible positions according to the order of said priority numbers.

6. The apparatus for image data processing as defined in claim 4, further comprising a decoding management means for directing said decoding means to try another decoding method incase said decoding attempt fails.

7. An apparatus for image data processing wherein an image data is given an image ID to specify said image data and then filed in a storage means, and wherein a marked sheet with an image ID mark integrated in said image data, said document ID mark representing said image ID, is printed out, said apparatus comprising:

a second position means for deciding on the position on a sheet of paper for said means decides on the position to integrate said document ID mark on the basis of the specification from said image data inputting means.

8. The apparatus for image data processing as defined in claim 7, further comprising a positioning marking device including guide frames representing different sizes of paper drawn on a document plate of an image data inputting means and simulation marks drawn at positions to put the document ID mark within said guide frames, and wherein said second positioning means decides on the position to integrate the document ID mark on the basis of the size of said sheet of paper and the position of the simulation mark.

9. The apparatus for image data processing as defined in claim 8, which is provided with a pair of original copy size regulating sliders having a simulation mark at a specific part of said sliders to affect the positioning of said sheet of paper, said regulating sliders being movable in the direction perpendicular of the feeding direction.

10. The apparatus for image data processing as defined in claim 7, further comprising an inputting operation means capable of specifying the position on said sheet of paper where said document ID mark is integrated with said image data, and wherein said second positioning means decides on the position to integrate the document ID mark at on the basis of the size of said sheet of paper, the position of the simulation mark and said specification from an image data inputting means.

11. The apparatus for image data processing as defined in claim 10, further comprising an inputting operation means capable of specifying, from a display screen, the position on said sheet of paper, according to the lay of an original sheet of paper on an original plate, where the said document ID mark is integrated in said image data, and wherein said second positioning said position information table on the basis of the sheet size found by said detection means, a pattern synthesizing means for synthesizing said ID mark at the ID mark writing position determined by said first position means and the image data into a pattern, and a printing means for printing the synthesized pattern.

12. The apparatus for image data processing as defined in claim 11, wherein the lay of said sheet of paper put on the document plate can be known from a sheet size detection means for detecting the length of the sides in the feeding direction of the sheet put on the document plate and the length of the sides perpendicular thereto.

13. The apparatus for image data processing as defined in claim 11, wherein the lay of said paper is inputted by an inputting operation means.

14. The apparatus for image data processing as defined in claim 7, further comprising a contents lay checking means for checking the lay of the contents of said image data and wherein said second positioning means decides on the position to integrate said document ID mark on the basis of the paper size, the checking results of said contents lay checking means and the specification from said inputting operation means.

15. The apparatus for image data processing as defined in any of claim 7, wherein said paper size can be known from a sheet size detection means for detecting the length of the sides in the feeding direction of a sheet of paper put on the document plate and the length of the sides perpendicular thereto.

16. The apparatus for image data processing as defined in claim 7, wherein said paper size is inputted by an inputting operation means.

17. An apparatus for image data processing wherein an image data is given a document ID to specify said image data and filed in a storage means, wherein a marked sheet of paper with a document ID mark integrated in said image data, said document ID mark representing said document ID, is printed out, and wherein said document ID mark on the marked sheet of paper is read by a reading means and converted into a document ID to specify said filed image data, said apparatus comprising:
a second positioning means for deciding on the position of said document ID mark on the sheet of paper when said document ID mark is decoded, and
a decoding means for reading and decoding said document ID mark at the position where said image data is integrated, said position decided on by said second positioning means.

18. The apparatus for image data processing as defined in claim 17, further comprising a positioning marking device including guide frames representing different sizes of paper drawn on the document plate of an image data inputting means and simulation marks drawn within said guide frames at positions to inscribe the document ID mark, and wherein said second positioning means decides on the position to read out the document ID mark at on the basis of paper size and the position of the simulation mark.

19. The apparatus for image data processing as defined in claim 17, further comprising an inputting operation means capable of specifying the position on said sheet of paper where said document ID mark is integrated with said image data and wherein said second positioning means decides on the position to read out the document ID mark at on the basis of the size of said sheet of paper and the specification from said inputting operation means.

20. The apparatus for image data processing as defined in claim 19, further comprising an inputting operation means capable of specifying, from a display screen, the paper position according to the lay of a sheet of paper on a document plate, on said sheet of paper where said document ID mark is integrated in said image data, and wherein said second positioning means decides on the position to read out said document ID mark at on the basis of the specification from said inputting operation means.

21. The apparatus for image data processing as defined in claim 17, further comprising a contents lay checking means for checking the lay of the contents in the original of said image data and wherein said second positioning means decides on the position to read out said document ID mark at on the basis of the paper size, the checking results of said contents lay checking means and the specification from said inputting operation means.

22. An apparatus for image data processing wherein an image data is filed in a storage means with a document ID given to said image data and managed by a document image managing means, wherein there is provided an image outputting means for outputting said filed document with a document ID mark inscribed therein, said document ID mark generated by an encoding means and said document ID mark corresponding to said document ID, and wherein said document ID mark is decoded by a document ID decoding means, thereby finding out the corresponding image data,
wherein said decoding means decodes the ID mark when copying is affected using an image inputting means and said image outputting means, and
wherein said document image managing means specifies the corresponding image data on the basis of a document ID obtained from said decoding means and outputs the document ID position data of the image data, and further comprising:
a pattern synthesizing means for synthesizing a specific image at said document ID mark position of the image data and handing over said synthesized image to the outputting means.

23. The apparatus for image data processing as defined in claim 22, wherein said encoding means generates a document ID mark on the basis of the document ID obtained from said ID decoding means, and wherein the document ID mark is synthesized at said document ID mark position by said pattern synthesizing means.

24. The apparatus for image data processing as defined in claim 22, further comprising a clipping means for extracting an image data at the corresponding document ID mark position from said storage means, and wherein the image data extracted by said clipping means is synthesized at said document ID mark position by said pattern synthesizing means.

25. The apparatus for image data processing as defined in claim 22, further comprising a masking means for forming a masked image of a specific size, and wherein the masked image outputted by said masking means is synthesized at said document ID mark position by said pattern synthesizing means.

26. A method for image data processing wherein an image data is filed in a storage means with a document ID given to said image data and managed by a document image managing means, wherein there is provided an image outputting means for outputting said filed image data with a document ID mark given thereto, said document ID mark corresponding to said document ID and generated by said encoding means, and wherein said document ID mark is decoded by said document ID decoding means, thereby finding out the corresponding image data, said method comprising:
a decoding step for decoding the ID mark when copying is affected using an image inputting means and said image outputting means,
a document image managing step for specifying the corresponding image data on the basis of the document ID obtained from said decoding means and extracting the document ID mark position in said image data, and
a pattern synthesizing step for synthesizing a specific image at said document ID mark position in the image data and handing over said synthesized image to the image outputting means.

27. The apparatus for image data processing as defined in claim 26, wherein said specific image is a document ID mark encoded from said document ID.

28. The apparatus for image data processing as defined in claim 26, wherein said specific image is an image extracted from said storage means, said extracted image taken out from the area in the image data corresponding to said document ID mark position.

29. The apparatus for image data processing as defined in claim 26, wherein said specific image is a masking image to mask said document ID position.

30. An apparatus for image data processing wherein inputted image data is filed in a storage means and managed by an image managing means on the basis of a document ID generated sequentially by said image managing means, said document ID representing said inputted image data, and wherein said inputted image data is outputted from said image outputting means along with at least one of an ID mark and a display code generated on the basis of a document ID to specify said image data, said apparatus comprising:

a scrambling means for converting said document ID generated by said document image managing means into a scrambled document ID which corresponds to said document ID one to one but is not logically sequential to other document IDs and for outputting said display code and/or ID mark code on the basis of said scrambled document ID, and a pattern synthesizing means for synthesizing said image data, said display code and ID mark code, and for instructing said image outputting means to output the synthesized image data.

31. The apparatus for image data processing as defined in claim 30, further comprising an encoding means for encoding said ID mark code to said ID mark such that an image pattern defined by said ID mark is synthesized by said pattern synthesizing means.

32. The apparatus for image data processing as defined in claim 30, wherein said display code is said scrambled document code while said ID mark code is said document ID.

33. The apparatus for image data processing as defined in claim 30, wherein said display code and said ID mark code are said scrambled document ID.

34. An apparatus for image data processing wherein an image data is filed in a storage means and managed by a document image managing means on the basis of a document ID generated sequentially by said document image managing means, said document ID representing said image data, and wherein said image data is outputted from said image outputting means along with at least one of an ID mark and a display code generated on the basis of a document ID to specify said image data, said apparatus comprising:

a scrambling means for converting said document ID generated by said document image managing means into a scrambled document ID which corresponds to said document ID one to one but is not logically sequential to other document IDs and for outputting said display code and/or ID mark code on the basis of said scrambled document ID, and a code type selection means enabling an operator to choose on which basis to output at least one of said display code and said ID mark code, on the basis of said document ID or said scrambled document ID, and a pattern synthesizing means for synthesizing at least one of said image data and said display code and ID mark code generated on the basis of said ID mark code, and for instructing said image outputting means to output the integrated image data.

35. An apparatus for image data processing wherein image data is filed in a storage means and managed by an image managing means on the basis of a document ID generated sequentially by said image managing means, said document ID representing said inputted image data, a specific image data is specified by inputting either an ID mark or a display code representing said document ID, said apparatus comprising:

a scrambled document ID decoding means for converting said inputted ID mark into a document ID corresponding to said scrambled document ID if the value of the mark code or the inputted display code is converted into a value before encoding and wherein said value is based on the scrambled document ID.

36. The apparatus for image data processing as defined in claim 35, further comprising a decoding means for converting said inputted ID mark into an ID mark code before encoding when a specific image data is specific by inputting said ID mark.

37. The apparatus for image data processing as defined in claim 35, further comprising an ID checking means to check if said display code or said ID mark code is said document ID or said scrambled document ID.

38. A method for image data processing wherein inputted image data is filed in a storage means and managed by an image managing means on the basis of a document ID generated sequentially by said image managing means, said document ID representing said inputted image data, and wherein said inputted image data is outputted from an image outputting means along with at least one of an ID mark and a display code generated on the basis of a document ID to specify said image data, said method comprising the steps of:

converting the document ID into a scrambled document ID corresponding to said document ID but not logically sequential to other document IDs, and outputting at least one of a display code and an ID mark code on the basis of said scrambled document ID, and integrating said image data with said ID mark and/or said display code, and outputting said integrated data by said image outputting means.

39. A method for image data processing wherein inputted image data is filed in a storage means and managed by an image managing means on the basis of a document ID generated sequentially by said image managing means, said document ID representing said inputted image data, a specific image data is specified by inputting either an ID mark code or a display code representing said document ID, said method comprising a step of:

converting said inputted ID mark code into a document ID corresponding to said scrambled document ID if the ID mark code or the display code is converted into a value before encoding, and wherein said value is based on the scrambled document ID.

40. A method for image data processing wherein inputted image data is filed in a storage means and managed by the image managing means on the basis of a document ID generated sequentially by said image managing means, said document ID representing said inputted image data, and wherein said inputted image data is outputted from said image outputting means along with at least one of an ID mark and a display code generated on the basis of a document ID to specify said image data, characterized in that:

an operator can choose in which way to output said ID mark and/or said display code, as value with a specific degree of confidentiality or a value with a higher degree of confidentiality than the specific degree of confidentiality.

41. The method for image data processing as defined in claim 40, wherein said value with a specific degree of confidentiality is one of logically consecutive values and said value with a higher degree of confidentiality is one of logically nonconsecutive numbers.

* * * * *

UNITED STATES PATENT AND TRADEMARK OFFICE
CERTIFICATE OF CORRECTION

PATENT NO.     : 6,661,933 B1
DATED          : December 9, 2003
INVENTOR(S)    : Kenji Hisatomi et al.

It is certified that error appears in the above-identified patent and that said Letters Patent is hereby corrected as shown below:

Column 29,
Lines 31 to 37, should be replace with:
-- in the ID mark that refers to said position information table on the basis of the sheet size found by said detection means,
a pattern synthesizing means for synthesizing said ID mark at the ID mark writing position determined by said first position means and the image data into a pattern, and a printing means for printing the synthesized pattern. --.

Column 30
Lines 19-21, should be replaced with -- a sheet of paper for said document ID mark when said document ID mark is integrated in said image data and
an image pattern synthesizing means for synthesizing said document ID mark at the position decided on by said second positioning means, therein preparing an image data representing said marked sheet. --.
Lines 52-58, should be replaced with -- second positioning means decides on the position to integrate said document ID mark on the basis of the specification from said image data inputting means. --.
Lines 60-64, should be replaced with -- claim 11, wherein the lay of said sheet of paper can be known fron an original copy size detection means for detecting the length of the sides in the feeding direction of the original put on the original plate and the length of the sides perpendicular thereto. --.

Column 33,
Line 25, after "data", delete "," and insert -- and --.
Line 40, delete "an" (second occurrence) and insert -- inputted --;
Line 58, delete the phrase "at least one of";

UNITED STATES PATENT AND TRADEMARK OFFICE
CERTIFICATE OF CORRECTION

PATENT NO. : 6,661,933 B1
DATED : December 9, 2003
INVENTOR(S) : Kenji Hisatomi et al.

It is certified that error appears in the above-identified patent and that said Letters Patent is hereby corrected as shown below:

Column 33, cont'd.,
Line 59, change "and said" to -- and/or said --;
Line 62, after "data" insert -- , -- and delete "and".

Signed and Sealed this

Twenty-seventh Day of July, 2004

JON W. DUDAS
*Acting Director of the United States Patent and Trademark Office*